United States Patent
Shi et al.

(10) Patent No.: US 12,323,444 B2
(45) Date of Patent: Jun. 3, 2025

(54) ALARM PROCESSING METHOD AND APPARATUS, ELECTRONIC DEVICE, COMPUTER PROGRAM PRODUCT, AND COMPUTER-READABLE STORAGE MEDIUM

(71) Applicant: TENCENT TECHNOLOGY (SHENZHEN) COMPANY LIMITED, Shenzhen (CN)

(72) Inventors: Xiaorong Shi, Shenzhen (CN); Aisi Xu, Shenzhen (CN); Liquan Nie, Shenzhen (CN); Junli Shen, Shenzhen (CN); Fan Zeng, Shenzhen (CN); Hankeng Rong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 17/992,085

(22) Filed: Nov. 22, 2022

(65) Prior Publication Data
US 2023/0087267 A1 Mar. 23, 2023

Related U.S. Application Data

(63) Continuation of application No. PCT/CN2022/076268, filed on Feb. 15, 2022.

(30) Foreign Application Priority Data

Feb. 19, 2021 (CN) .................. 202110189703.3

(51) Int. Cl.
*G06F 16/28* (2019.01)
*G06F 16/22* (2019.01)
*H04L 9/40* (2022.01)

(52) U.S. Cl.
CPC ...... *H04L 63/1425* (2013.01); *G06F 16/2237* (2019.01); *G06F 16/285* (2019.01)

(58) Field of Classification Search
CPC ............ H04L 63/1425; H04L 63/1416; H04L 41/0631; G06F 16/2237; G06F 16/285
See application file for complete search history.

(56) References Cited

U.S. PATENT DOCUMENTS 10,346,851 B1 * 7/2019 Kapoor ............... G06Q 30/016
10,459,962 B1 * 10/2019 Jayaraman ............ G06F 16/345
(Continued)

FOREIGN PATENT DOCUMENTS

| CN | 105550714 A | 5/2016 |
| CN | 109241282 A | 1/2019 |

(Continued)

OTHER PUBLICATIONS

China National Intellectual Property Administration (CNIPA) Office Action 1 for 202110189703.3, Apr. 8, 2021 9 Pages (including translation).

(Continued)

*Primary Examiner* — Michael R Vaughan
*Assistant Examiner* — Abdullah Almamun
(74) *Attorney, Agent, or Firm* — ANOVA LAW GROUP, PLLC

(57) ABSTRACT

An alarm processing method includes: receiving an alarm query request for a service, and acquiring a plurality of alarm records of the service; performing keyword extraction processing on the alarm record according to an attack word library of the service to obtain an attack keyword; determining a similarity between every two of the plurality of alarm records according to the attack keywords in the alarm (Continued)

records; and clustering the plurality of alarm records according to the similarity to obtain a plurality of alarm record clusters.

17 Claims, 17 Drawing Sheets

(56) References Cited

U.S. PATENT DOCUMENTS

| | | | | |
|---|---|---|---|---|
| 11,151,325 | B2* | 10/2021 | Turkkan | G06F 16/3347 |
| 11,204,824 | B1* | 12/2021 | Tiwari | G06F 11/0793 |
| 11,651,032 | B2* | 5/2023 | Jayaraman | G06F 40/30 |
| | | | | 706/12 |
| 11,720,599 | B1* | 8/2023 | Lin | G06F 16/2246 |
| | | | | 707/738 |
| 2007/0206770 | A1* | 9/2007 | Yamanaka | H04M 3/5233 |
| | | | | 379/265.01 |
| 2011/0016111 | A1* | 1/2011 | Xie | G06F 16/3346 |
| | | | | 707/723 |
| 2017/0228658 | A1* | 8/2017 | Lim | G06F 18/24147 |
| 2019/0286700 | A1* | 9/2019 | Jayaraman | G06F 16/334 |
| 2020/0013070 | A1* | 1/2020 | Walthers | G06F 16/285 |
| 2020/0089765 | A1* | 3/2020 | Jayaraman | G06N 3/084 |
| 2020/0202302 | A1* | 6/2020 | Rathod | G06F 18/2135 |
| 2020/0302018 | A1* | 9/2020 | Turkkan | G06F 40/284 |
| 2020/0349199 | A1* | 11/2020 | Jayaraman | G06F 40/49 |

FOREIGN PATENT DOCUMENTS

| | | |
|---|---|---|
| CN | 110213077 A | 9/2019 |
| CN | 110727663 A | 1/2020 |
| CN | 110855648 A | 2/2020 |
| CN | 110933083 A | 3/2020 |
| CN | 111294233 A | 6/2020 |
| CN | 111367777 A | 7/2020 |
| CN | 111488732 A | 8/2020 |
| CN | 111541661 A | 8/2020 |
| CN | 111800290 A | 10/2020 |
| CN | 112132491 A | 12/2020 |
| CN | 112148772 A | 12/2020 |
| CN | 112564988 A | 3/2021 |

OTHER PUBLICATIONS

The World Intellectual Property Organization (WIPO) International Search Report for PCT/CN2022/076268 Apr. 25, 2022 7 Pages (including translation).

* cited by examiner

ALARM PROCESSING METHOD AND APPARATUS, ELECTRONIC DEVICE, COMPUTER PROGRAM PRODUCT, AND COMPUTER-READABLE STORAGE MEDIUM

CROSS-REFERENCE TO RELATED APPLICATIONS

This application is a continuation application of PCT Patent Application No. PCT/CN2022/076268, filed on Feb. 15, 2022, which claims priority to Chinese Patent Application No. 202110189703.3 filed on Feb. 19, 2021, the entire content of all of which is incorporated herein by reference in their entirety.

FIELD OF THE TECHNOLOGY

The present disclosure relates to computer and cloud technologies and, more particularly, to an alarm processing method and apparatus, an electronic device, a computer program product, and a computer-readable storage medium.

BACKGROUND OF THE DISCLOSURE

Alarm records are often generated during service operations due to data errors or out-of-specification user operations, and the magnitude of generated alarm records increases exponentially as the size of the service increases. To avoid excessive alarm records adversely affecting the alarm operation process, it is often necessary to merge multiple alarm records.

Alarm records are generally classified into categories according to specific merging fields in the alarm records. For example, a source Internet Protocol (IP) address is used as the merging field, and in particular, a plurality of alarm records with the same source IP address are classified into one category. However, the granularity of merging results obtained by this scheme may be too coarse or too fine, which cannot reflect the core reason that the service is attacked, resulting in that relevant personnel needs to further query after obtaining the merging results. Large consumption of computing resources for electronic devices may be caused.

SUMMARY

The embodiments of the present disclosure provide an alarm processing method and apparatus, an electronic device, a computer program product and a computer-readable storage medium, and can accurately and effectively reflect the core reason of a service being attacked according to a plurality of alarm record clusters and avoid the waste of computing resources of the electronic device.

The embodiments of the present disclosure provide an alarm processing method, including: receiving an alarm query request for a service, and acquiring a plurality of alarm records of the service; performing keyword extraction processing on the alarm records according to an attack word library of the service to obtain attack keywords; determining a similarity between every two of the plurality of alarm records according to the attack keywords in the alarm records; and clustering the plurality of alarm records according to the similarity to obtain a plurality of alarm record clusters.

The embodiments of the present disclosure provide an electronic device. The electronic device includes a memory, configured to store executable instructions; and a processor, coupled with the memory and configured, when the executable instructions being executed, to perform an alarm processing method. The method includes receiving an alarm query request for a service, and acquiring a plurality of alarm records of the service; performing keyword extraction processing on the alarm records according to an attack word library of the service to obtain attack keywords; determining a similarity between every two of the plurality of alarm records according to the attack keywords in the alarm records; and clustering the plurality of alarm records according to the similarity to obtain a plurality of alarm record clusters.

The embodiments of the present disclosure provide a non-transitory computer-readable storage medium storing executable instructions. When being executed, the executable instructions causes a processor to implement an alarm processing method. The method includes receiving an alarm query request for a service, and acquiring a plurality of alarm records of the service; performing keyword extraction processing on the alarm records according to an attack word library of the service to obtain attack keywords; determining a similarity between every two of the plurality of alarm records according to the attack keywords in the alarm records; and clustering the plurality of alarm records according to the similarity to obtain a plurality of alarm record clusters.

The embodiments of the present disclosure have the following beneficial effects.

As disclosed, keyword extraction processing is performed on the alarm records of the service according to the attack word library of the service to obtain attack keywords, the similarity between different alarm records is determined according to the attack keywords in the alarm records, as the similarity is obtained according to the attack keywords, the alarm record clusters obtained after clustering a plurality of alarm records according to the similarity can accurately and effectively reflect the core reason of the service being attacked, facilitate security protection for the service, and meanwhile can also save the actual utilization rate of computing resources consumed by the electronic device in alarm processing.

DESCRIPTION OF EMBODIMENTS

Figure 1:
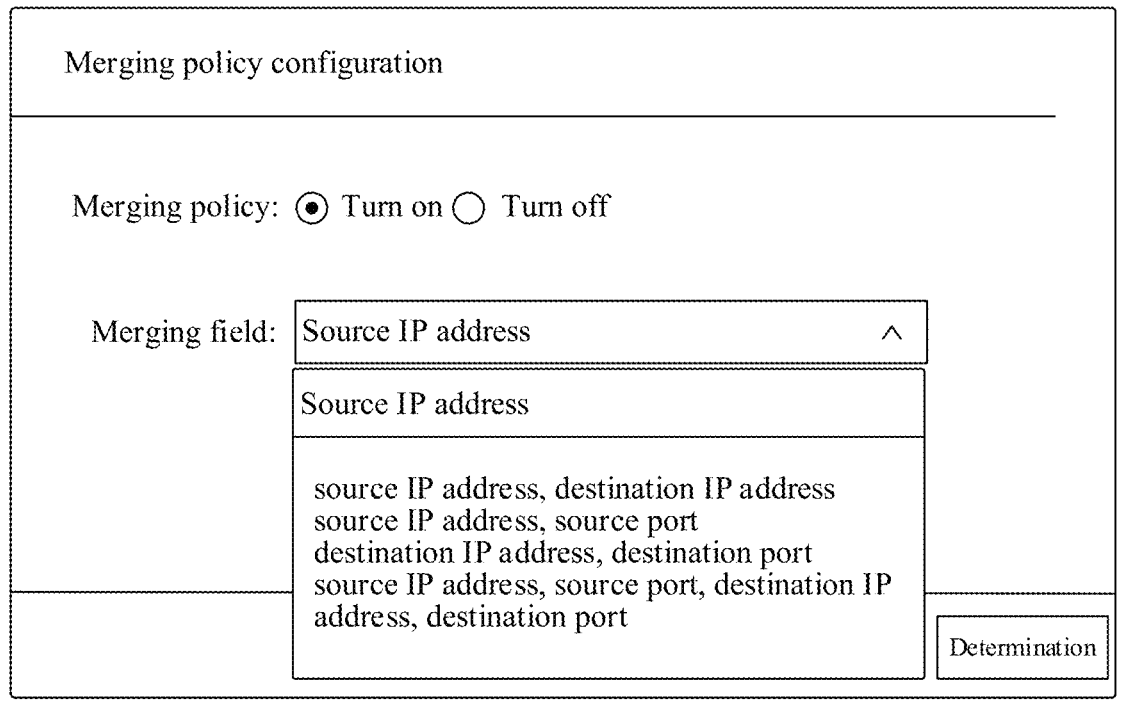
FIG. 1 is a schematic diagram of an alarm processing scheme.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following description, the term "some embodiments" describes subsets of all possible embodiments, but it may be understood that "some embodiments" may be the same subset or different subsets of all the disclosed embodiments, and can be combined with each other in any manners without conflict to form various embodiments.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of the present disclosure described herein can be implemented in a sequence in addition to the sequence shown or described herein. In the following description, the term "a plurality of" means at least two.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on terms in the embodiments of the present disclosure, and the terms in the embodiments of the present disclosure are applicable to the following explanations.

(1) Service: the embodiments of the present disclosure do not define the type of a service, for example, it can be a financial service, an instant messaging service or a video service, etc. and for example, it can be an on-line service or an off-line service. A service may be split into a plurality of sub-services, for example, a service provided by a software enterprise may be split into sub-services provided by various departments of the software enterprise.

(2) Alarm records: The alarm records also referred to as alarm data are records of triggering alarms generated during operation of the service. The form of the alarm records is not limited in this embodiment of the present disclosure, for example, it can be a hypertext transfer protocol (HTTP) request or a request for applying other protocols, etc.; The triggering rule for the triggering alarms is likewise not defined, for example, a request initiated by a source IP address without access rights may be used as an alarm record.

(3) Attack word library: keyword extraction processing is performed on the alarm records to obtain attack keywords, and a plurality of words in the attack word library can be preset, and can also be obtained by analyzing a plurality of sample attack records, where the attack keywords can reflect the core semantics of the alarm records. In addition, a security word library in this embodiment of the present disclosure is used for filtering the alarm records/sample attack records, and similarly, a plurality of words in the security word library can be preset, and can also be obtained by analyzing a plurality of sample security records, where the sample security records are records marked as secure.

(4) Clustering processing: The clustering processing refers to a process of dividing a set of abstract objects (an abstract object is an alarm record in this embodiment of the present disclosure) into a plurality of clusters composed of similar abstract objects, and the manner of clustering processing is not limited in this embodiment of the present disclosure, for example, clustering processing can be realized by an algorithm such as a K-Means algorithm or a Density-Based Spatial Clustering of Applications with Noise (DBSCAN) algorithm.

(5) Importance indexes: The importance indexes of a word are used for representing the actual importance of the word, and as an example, the importance indexes of the word may be positively correlated with the actual importance or negatively correlated with the actual importance, depending on a calculation method of the importance indexes.

(6) Mapping processing: Mapping processing refers to mapping an input of an arbitrary length to an output of a fixed length, and in this embodiment of the present disclosure, an attack keyword is mapped to a mapping value in a numerical form. As an example, the mapping processing may be implemented based on a hash principle, and a mapping function may be a hash function.

(7) Artificial intelligence (AI) is a theory, method, technology and application system that uses digital computers or machines controlled by digital computers to simulate, extend and expand human intelligence, perceive the environment, acquire knowledge, and use knowledge to obtain the best results. In embodiments of the present disclosure, automated alarm processing may be implemented based on AI.

(8) Cloud technology is a hosting technology that unifies a series of resources such as hardware, software, and networks in a wide area network or a local area network to implement computing, storage, processing, and sharing of data. Cloud security is an important application of a cloud technology, and refers to a general term of security software, hardware, users, institutions and a security cloud platform based on a cloud computing business model application. In this embodiment of the present disclosure, alarm processing can be performed at a cloud end so as to provide a cloud security service for the service.

(9) Database: A database is a set of data that are stored together in a certain manner, can be shared with multiple users, have as little redundancy as possible, and are independent of applications. The user can perform the operations such as adding, querying, updating and deleting on the data in the database.

In view of the fact that the alarm records in the service are relatively large in order of magnitude, which is inconvenient to operate and manage, and in a solution provided by the related art, a plurality of alarm records are generally merged according to specific merging fields such as at least one of a source IP address, a source port, a destination IP address and a destination port in the alarm records, as shown in FIG. 1. However, this solution has the following problems: (1) when there are parameter values continuously changing in the merging field, the merging effect is poor, and eventually a large number of merging results will still be obtained; (2) the merging method is too rigid, and in different scenarios, the granularity of the merging results may be too coarse or too fine, which is inconvenient for analyzing the causes of alarms and performing refined operations, resulting in low efficiency of alarm processing; and (3) merging policies (e.g. merging fields) need to be determined by expert experience and need to be adjusted manually according to different scenarios, which relies too much on human experience and consumes relatively high manpower costs.

The embodiments of the present disclosure provide an alarm processing method and apparatus, an electronic device, a computer-readable storage medium and a computer program product, the efficiency of alarm processing can be improved in an automated manner, so that the obtained multiple alarm record clusters can accurately and effectively reflect the core reason of the service being attacked, and meanwhile, the actual utilization rate of computing resources consumed by the electronic device in the alarm processing can also be increased. The following describes exemplary applications of the electronic device provided by the embodiments of the present disclosure, which may be performed independently by a terminal or cooperatively by a terminal and a server.

Figure 2:
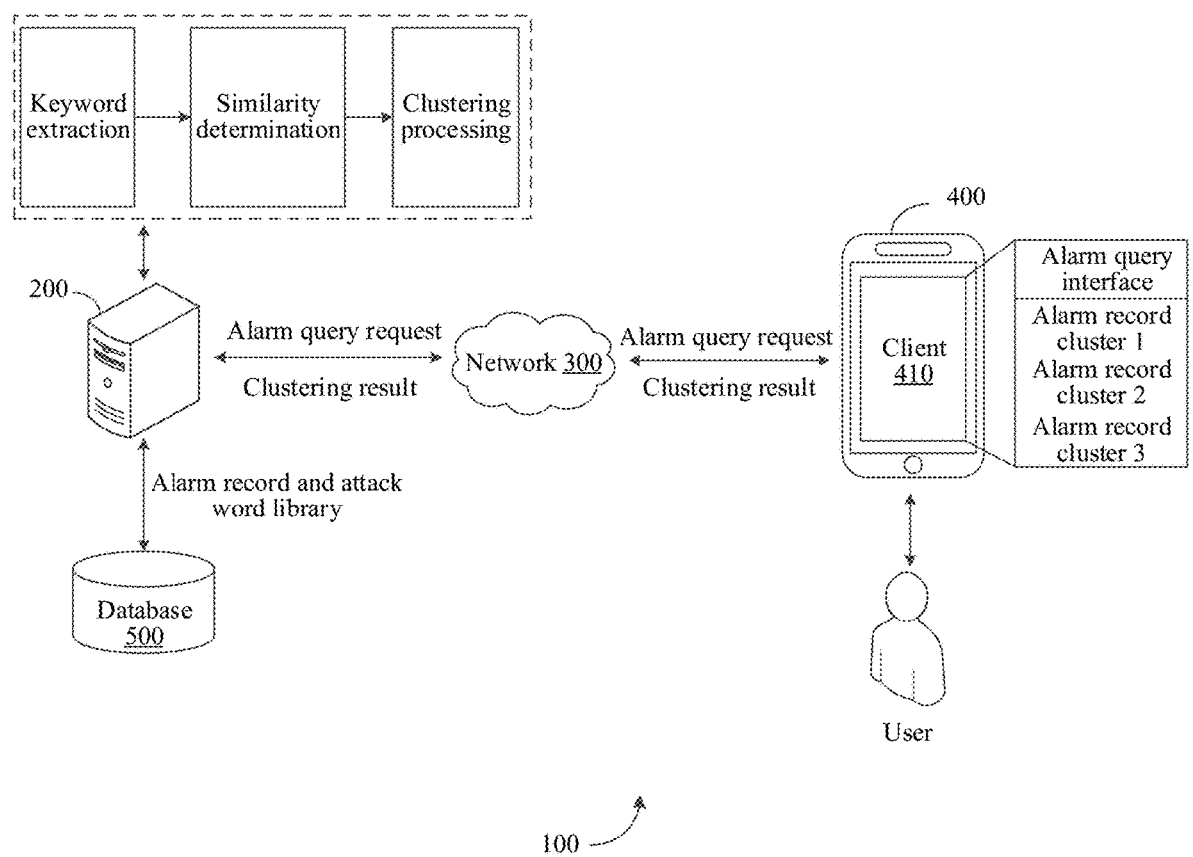
FIG. 2 is an architecture schematic diagram of an alarm processing system provided by an embodiment of the present disclosure.

Referring to FIG. 2, FIG. 2 is an architecture schematic diagram of an alarm processing system 100 provided by an embodiment of the present disclosure, a terminal device 400 is connected to a server 200 via a network 300, and the server 200 is connected to a database 500, where the network 300 may be a wide area network or a local area network, or a combination of both.

In some embodiments, the alarm processing method provided by an embodiment of the present disclosure may be independently implemented by the terminal device. For example, the terminal device 400 runs a client 410 (such as an operation client of the service), when receiving the alarm query request for the service, the client 410 acquires a plurality of alarm records of the service, and performs keyword extraction processing individually on each alarm record according to the attack word library of the service to obtain the attack keywords in the alarm records. The alarm records can be stored locally in the client 410 in advance, for example, being stored in the form of a log, and can also be acquired by the client 410 from the outside, for example, being acquired from a database 500 or from a block chain node (referring to a node in a block chain network), and the attack word library is in the same way. Then, the client 410 determines the similarity between different alarm records according to the attack keywords in the alarm records, performs clustering processing on the plurality of alarm records according to the similarity to obtain a plurality of alarm record clusters, and finally responds to the alarm query request according to the plurality of alarm record clusters. As an example, in an alarm query interface of the client 410 shown in FIG. 2, clustering results obtained by clustering processing are shown, specifically including alarm record clusters 1, 2 and 3, as responses to the alarm query request.

In some embodiments, the alarm processing method provided by the embodiments of the present disclosure can also be cooperatively implemented by the server and the terminal device. For example, the client 410 transmits the received alarm query request for the service to the server 200 (such as a server for providing a service), and the server 200 obtains a plurality of alarm records of the service and the attack word library of the service from the database 500 (or the block chain node) when receiving the alarm query request, where the database 500 can be used for storing the plurality of alarm records in the service in the form of a log. After performing a series of processing according to the obtained alarm records and the attack word library, the server 200 transmits the obtained multiple alarm record clusters to the client 410 to be presented in the interface of the client 410.

The terminal device 400 or the server 200 described above may be used to run a service or may be dedicated to alarm processing of a service independently of the service.

In some embodiments, the terminal device 400 or the server 200 may implement the alarm processing method provided by the embodiments of the present disclosure by running a computer program, for example, the computer program may be a native program or a software module in an operating system; the computer program can be a native application (APP) program, namely, a program which needs to be installed in the operating system to be run, such as an application program for performing alarm processing on the service; and the computer program can also be a small program, namely, a program which is executable only by downloading it into a browser environment; and the computer program may also be applets that can be embedded into any APP. In general, the computer program may be any form of application, module or plug-in.

In some embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The cloud service may be an alarm processing service for the terminal device 400 to invoke. The terminal device 400 may be a smartphone, a tablet computer, a notebook computer, a desktop computer, a smart television, a smartwatch, or the like, but is not limited thereto. The terminal device and the server may be directly or indirectly connected in a wired or wireless communication manner. This is not limited in this embodiment of the present disclosure.

Figure 3:
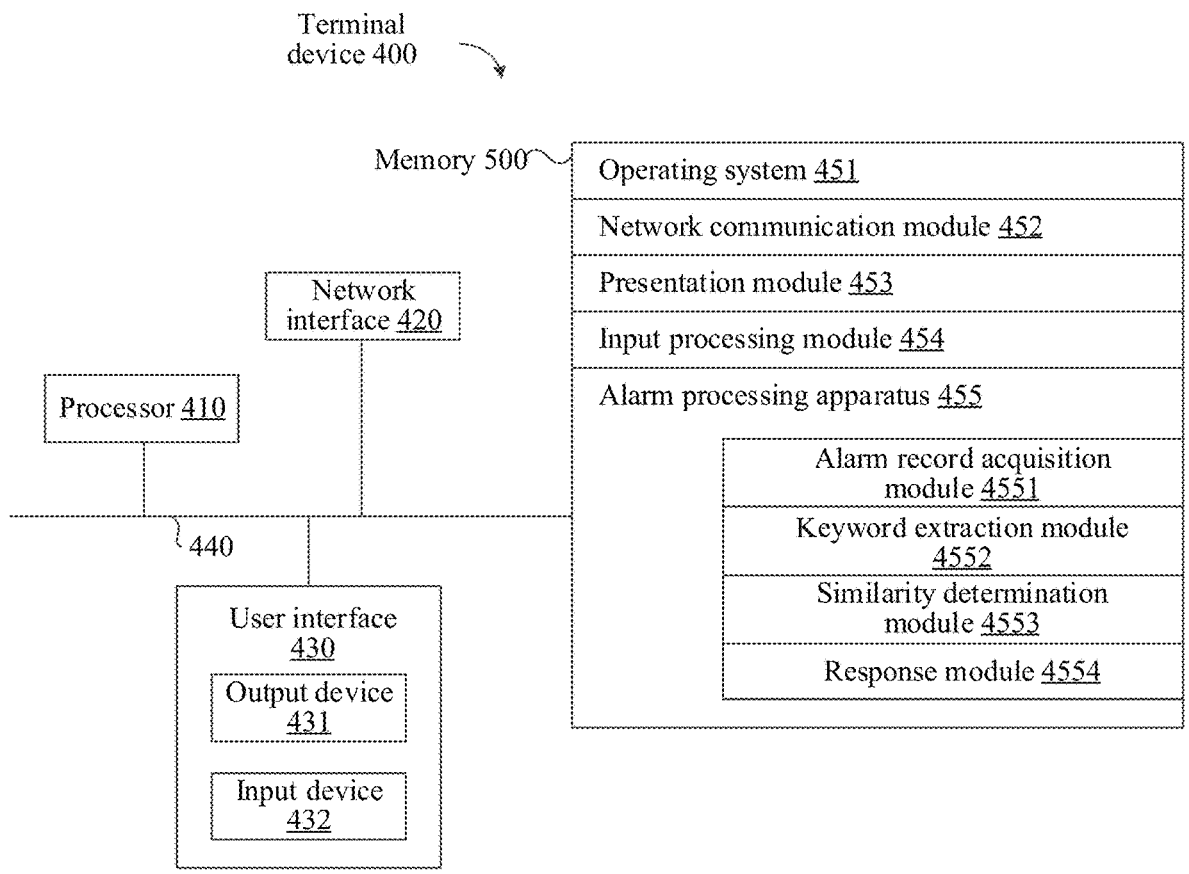
FIG. 3 is an architecture schematic diagram of a terminal device provided by an embodiment of the present disclosure.

The electronic device provided by the embodiments of the present disclosure is illustrated as the terminal device, and it will be appreciated that for the case where the electronic device is the server, portions in the architecture shown in FIG. 3 (e.g. user interface, presentation module, and input processing module) may be defaulted. Referring to FIG. 3, FIG. 3 is a structural schematic diagram of the terminal device 400 provided by the embodiments of the present disclosure, and the terminal device 400 shown in FIG. 3 includes: at least one processor 410, a memory 450, at least one network interface 420, and a user interface 430. All the components in the terminal device 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any existing processor, or the like.

The user interface 430 includes one or more output devices 431 that enable presentation of media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input buttons and controls.

The memory 450 may be a removable memory, a non-removable memory, or a combination thereof. Exemplary hardware devices include a solid-state memory, a hard disk drive, an optical disc driver, or the like. The memory 450 may include one or more storage devices that are physically remote from the processor 410.

The memory 450 may be a volatile memory or a non-volatile memory, or may include a volatile memory and a non-volatile memory. The non-volatile memory may be a read-only memory (ROM), and the volatile memory may be a random access memory (RAM). The memory 450 described in this embodiment of the present disclosure is to include any other suitable type of memories.

In some embodiments, the memory 450 may store data to support operations. Examples of the data include programs, modules, and data structures, or a subset or a superset thereof, which are illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A presentation module 453 is configured to enable presentation of information via one or more output devices 431 (for example, a display screen, and a speaker) associated with the user interface 430 (for example, a user interface for operating peripheral devices and displaying content and information);

an input processing module 454 is configured to detect one or more user inputs or interactions from one of the one or more input devices 432 and translate the detected inputs or interactions.

In some embodiments, the apparatus provided by the embodiments of the present disclosure may be implemented in the form of software, and FIG. 3 shows an alarm processing apparatus 455 stored in the memory 450, which may be software in the form of a program and a plug-in, etc. including the following software modules: an alarm record acquisition module 4551, a keyword extraction module 4552, a similarity determination module 4553 and a response module 4554, where the modules are logical, and therefore, the modules can be arbitrarily combined or further split according to the realized functions. Functions of the modules are described as follows.

The alarm processing method provided by the embodiments of the present disclosure will be described with reference to the exemplary application and implementation of the electronic device provided by the embodiments of the present disclosure.

FIG. 4 is a schematic flowchart of the alarm processing method provided by the embodiments of the present disclosure, which will be described in conjunction with steps shown in FIG. 4A.

In step 101, receive an alarm query request for a service, and acquire a plurality of alarm records of the service.

For example, when the alarm query request for the service is received in a presented alarm query interface, the plurality of alarm records of the service are acquired, for example, the plurality of alarm records are acquired from alarm logs of the service. The form of the alarm records is not limited in this embodiment of the present disclosure, for example, it can be a HTTP request; The cause of the alarm records (alarm rules) is also not limited, and can be preset according to the characteristics of the service.

In step 102, perform keyword extraction processing on the alarm records according to the attack word library of the service to obtain attack keywords.

As an example, a plurality of words included in the attack word library can be preset, for example, a plurality of words which are determined artificially and have an attack on the service, and in addition, a plurality of sample attack records can be analyzed and processed so as to construct the attack word library, where the sample attack records can be records marked (e.g. artificially marked) as having an attack (threat) on a service.

When the alarm query request is received, the attack word library of the service can be acquired, and then keyword extraction processing is performed on the alarm records according to the attack word library to obtain the attack keywords. For example, word segmentation processing can be performed on the alarm records first, traversal processing is further performed on a plurality of words obtained by word segmentation processing, matching processing is respectively performed on the traversed words and the plurality of words in the attack word library, and when the traversed word is matched successfully with a certain word in the attack word library (representing that there is a word identical to the traversed word in the attack word library), the traversed word is taken as the attack keyword; and when the traversed word fails to be matched with all the words in the attack word library, no further processing is performed on the traversed word. Before performing word segmentation processing on the alarm records, preprocessing may also be performed, for example, the content (for example, messy codes) in the alarm records that does not conform to the record format can be shielded so as to reduce the quantity of subsequent calculations.

In step 103, determine the similarity between different alarm records according to the attack keywords in the alarm records.

For example, the similarity between attack keywords in different alarm records may be used as the similarity between different alarm records.

In some embodiments, the determining the similarity between different alarm records according to the attack keywords in the alarm records described above may also be achieved in this way: determining an intersection and a union between the attack keywords respectively corresponding to the different alarm records, and determining the similarity between the different alarm records based on the number of the attack keywords in the intersection and the number of the attack keywords in the union.

In the embodiments of the present disclosure, the similarity between the different alarm records may be determined based on the principle of a Jaccard coefficient. For example, if the attack keywords in the alarm record 1 include A, B and C, and the attack keywords in the alarm record 2 include B, C and D, then the intersection between the attack keywords respectively corresponding to the two alarm records includes B and C, the union includes A, B, C and D, and it can be further calculated that the similarity between the two alarm records is ½. By this way, the efficiency of determining the similarity can be improved, which is suitable for scenes with high real-time requirements.

In step 104, cluster the plurality of alarm records according to the similarity to obtain a plurality of alarm record clusters.

As an example, the plurality of alarm records are clustered according to the similarity, where the manner of clustering is not limited, for example, the clustering may be implemented by a K-Means algorithm or a DBSCAN algorithm. After clustering, the obtained clustering result includes the plurality of alarm record clusters, and each alarm record cluster includes a plurality of relatively similar alarm records. The obtained plurality of alarm record clusters can be used as responses to the alarm query request, for example, the plurality of alarm record clusters can be presented in the alarm query interface.

Compared with the alarm records, the number of the alarm record clusters is less, relevant personnel can quickly determine the core reason of the service being attacked (representing the occurrence of an alarm) according to the alarm record clusters and perform relevant processing, without multiple queries, and therefore, the computing resources of the electronic device can be effectively saved.

In some embodiments, after step 104, the method further includes: receiving a response processing request for any one of the alarm record clusters; and performing response processing on the plurality of alarm records in any one of the alarm record clusters, and responding to a response processing request based on a response processing result.

For example, the response processing request may be a blocking (intercepting) request for the source IP address, when the response processing request for any one of the alarm record clusters is received, batch blocking (intercepting) processing is performed on the source IP addresses in all the alarm records in the alarm record clusters so as to achieve security protection for the service, and certainly, the form of the response processing request is not limited thereto. In this way, batch processing of all the alarm records in the alarm record clusters can be realized, the refinement and simplification of the alarm operation is improved, and the tedious operations performed by relevant personnel can be avoided.

Figure 4A:
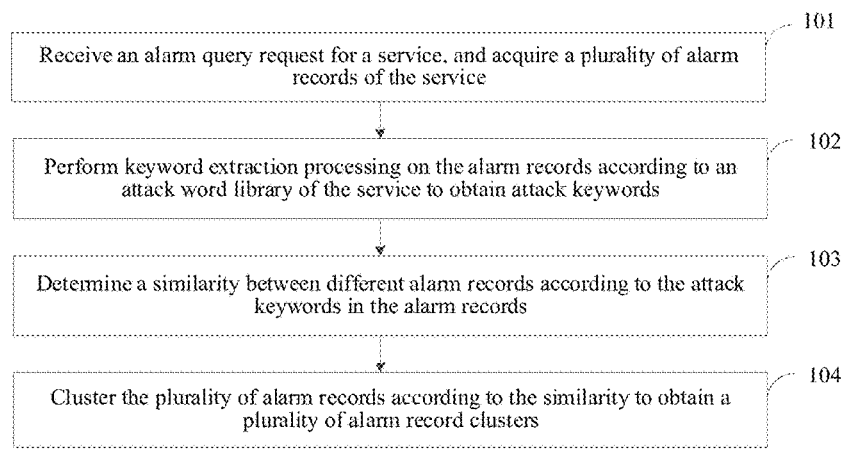
FIG. 4A is a schematic flowchart of an alarm processing method provided by an embodiment of the present disclosure.

As shown in FIG. 4A, in this embodiment of the present disclosure, the similarity between the different alarm records is determined according to the attack keywords in the alarm records, and the plurality of alarm records are clustered according to the similarity to obtain a plurality of alarm record clusters, so that the plurality of alarm record clusters can accurately and effectively reflect the core reason of the service being attacked, which is convenient for relevant personnel to quickly locate the problem and solve the problem in time, and meanwhile, the computing resources of the electronic device are also effectively saved.

Figure 4B:
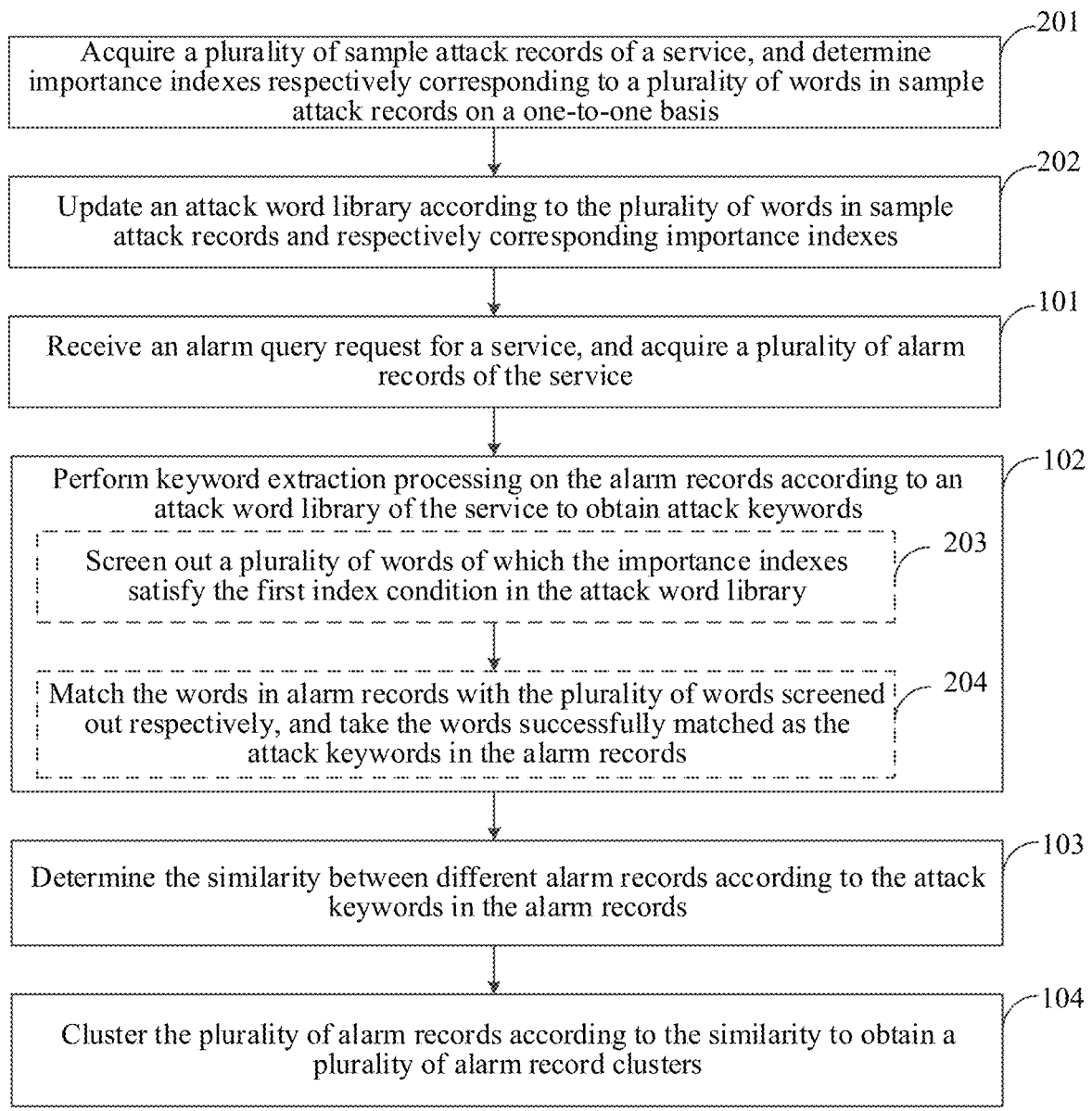
FIG. 4B is a schematic flowchart of an alarm processing method provided by an embodiment of the present disclosure.

In some embodiments, referring to FIG. 4B, FIG. 4B is a schematic flowchart of the alarm processing method provided by an embodiment of the present disclosure, based on FIG. 4A, before step 101, a plurality of sample attack records of the service can also be acquired in step 201, and importance indexes corresponding to a plurality of words in the sample attack records on a one-to-one basis can be determined.

As an example, the plurality of sample attack records for the service can be acquired, and the attack word library of the service is constructed based on the obtained plurality of sample attack records, where the sample attack records can be records historically marked as (e.g., manually marking) having an attack on the service. In the process of constructing the attack word library, for each sample attack record, firstly the sample attack record is preprocessed and subjected to word segmentation processing, and then the importance indexes respectively corresponding to the plurality of words obtained by word segmentation processing are determined, where the importance indexes of the words are used for representing the actual importance of the words, and the importance indexes may be positively correlated with the actual importance or negatively correlated with the actual importance, depending on the calculation method of the importance indexes.

For example, the importance indexes may be inverse document frequency (IDF), in which case the importance indexes of the words are negatively correlated with the actual importance, e.g., the higher the actual importance of the word, the lower the importance indexes of the word. In the calculation process, for a certain word, the total number of the plurality of acquired sample attack records can be divided by the number of the sample attack records including the words, and then logarithm processing (for example, taking a logarithm with a base of 10) is performed on a result obtained by the division processing to obtain the importance indexes of the word.

Step 201 may also be performed after step 101 and before step 102, and in FIG. 4A, for convenience of explanation. the case where step 201 is performed before step 101 is taken as an example.

In some embodiments, each sample attack record corresponds to an attack type; the above determination of the importance indexes corresponding to the plurality of words in the sample attack records on a one-to-one basis can be realized by this way: traverse a plurality of words in the sample attack records and performing the following processing on the traversed words: determine the total number of a plurality of sample attack records with the same attack type corresponding to the sample attack records, and determine the total number as a first number; determine the number of sample attack records including the traversed words in the plurality of sample attack records with the same attack type corresponding to the sample attack records, and take the determined number as a second number; and determine the importance indexes of the traversed words based on the first number and the second number.

As an example, each acquired sample attack record may correspond to an attack type for the service, where the attack types corresponding to different sample attack records may be the same or different, and in order to improve the comprehensiveness of alarm processing, sample attack records respectively corresponding to each attack type may be acquired. The embodiments of the present disclosure do not limit the attack types, for example, the attack types include, but are not limited to structured query language (SQL) injection, command (cmd) prompt injection, and component vulnerabilities.

Then, for each acquired sample attack record (taking a sample attack record 1 as an example), the importance indexes of each word in the sample attack record 1 can be determined within the range of all sample attack records (including the sample attack record 1 itself) with the same attack type corresponding to the sample attack record 1. For example, all the words in the sample attack record 1 can be traversed, and with regard to the traversed words, the total number of all the sample attack records with the same attack type corresponding to the sample attack record 1 is determined as the first number; and meanwhile, the number of the sample attack records including the traversed words is determined in all the sample attack records with the same attack type corresponding to the sample attack record 1, and the determined number is taken as a second number. The importance indexes of the traversed words are determined based on the first number and the second number, for example, division processing can be performed on the first number and the second number, and then logarithm processing is performed on the result obtained by division processing to obtain the importance indexes of the traversed words, where the importance indexes are negatively correlated with the actual importance.

Certainly, the importance indexes positively correlated with the actual importance can be obtained based on the first number and the second number, for example, division processing can be performed on the second number and the third number to obtain the importance indexes of the traversed words. By distinguishing different attack types in the above manner, the accuracy of the obtained importance indexes can be improved.

In some embodiments, after step 104, the method further includes: for each attack type, taking a plurality of words in the sample attack records corresponding to the attack types as the plurality of words corresponding to the attack types; taking an attack type corresponding to the attack keyword with the highest occurrence frequency in the alarm record clusters as a cluster attack type corresponding to the alarm record clusters; and responding to the alarm query request according to the plurality of alarm record clusters and the cluster attack types corresponding to the plurality of alarm record clusters on a one-to-one basis.

As an example, for each attack type, all the words in all the sample attack records corresponding to the attack types may be used as the words corresponding to the attack types. In some cases, after the importance indexes of all the words in all the sample attack records corresponding to the attack types are obtained, a word of which the importance indexes satisfy a first index condition can be used as a word corresponding to the attack type, so as to improve the accuracy of the established correspondence where the first index condition is described in detail later.

After the plurality of alarm record clusters are obtained by clustering, for each alarm record cluster, the attack type corresponding to the attack keyword with the highest occurrence frequency in all the alarm records included in the alarm record clusters is taken as the cluster attack type corresponding to the alarm record cluster. Then, responding to the alarm query request according to the plurality of alarm record clusters and the respectively corresponding cluster attack types, for example, presenting the plurality of alarm record clusters and the respectively corresponding cluster attack types. As the cluster attack types can directly reflect the core reason of the service being attacked, it can be convenient for relevant personnel to know the actual meaning of the alarm record clusters and perform subsequent processing by this way, for example, all the alarm records in the alarm record clusters are subjected to batch processing.

In step 202, update the attack word library according to the plurality of words in the sample attack records and the importance indexes corresponding to the plurality of words in the sample attack records on a one-to-one basis;

For each sample attack record, the plurality of words in the sample attack records and their corresponding importance indexes are added to the attack word library to update the attack word library.

In the embodiments of the present disclosure, the sample attack records can be continuously obtained so as to achieve continuous updating of the attack word library and improve the accuracy and real-time performance of the attack word library.

In FIG. 4B, step 102 shown in FIG. 4A may be implemented by steps 203 through 204, which will be described in conjunction with each step.

In step 203, screen out multiple words of which the importance indexes satisfy the first index condition in the attack word library;

As an example, screening processing can be performed on the attack word library (which may refer to the attack word library updated in step 202) according to a set index condition (named as the first index condition for the convenience of distinguishing), and the purpose of the screening processing is to screen out a plurality of words with the highest actual importance in the attack word library.

In some embodiments, the above-mentioned words screened out of which the importance indexes satisfy the first index condition in the attack word library may be achieved in the following way: when the importance indexes of the words in the attack word library are positively correlated with the actual importance, performing descending sorting processing on the plurality of words in the attack word library based on the importance indexes to obtain the plurality of words sorted top in the attack word library; and when the importance indexes of the words in the attack word library are negatively correlated with the actual importance, performing ascending sorting processing on the plurality of words in the attack word library based on the importance indexes to obtain the plurality of words sorted top in the attack word library.

As an example, the first index condition can be either a quantity condition or a proportion condition, and for the convenience of understanding, the former case is illustrated. When the importance indexes of the words in the attack word library are positively correlated with the actual importance, all the importance indexes in the attack word library can be sorted in descending order, and words respectively corresponding to top M importance indexes (or top P % of importance indexes, P being a number greater than 0) are screened out. When the importance indexes of the words in the attack word library are negatively correlated with the actual importance, all the importance indexes in the attack word library can be sorted in ascending order, and the words respectively corresponding to the top M importance indexes are screened out. M is an integer greater than 1. In this manner, a number of words with the highest actual importance in the attack word library can be effectively screened out.

In step 204, perform the following processing for each of the plurality of words in the alarm records: match the words with the plurality of words screened out, and take the words successfully matched as the attack keywords in the alarm records.

As an example, the plurality of words screened out in step 203 is determined as having an attack on the service. For each acquired alarm record, all the words in the alarm records are traversed, the traversed words are respectively matched with the plurality of words screened out, and when the traversed words are successfully matched with a certain word screened out, the traversed words are taken as the attack keywords in the alarm records; and when the traversed words fail to be matched with all the words screened out, no subsequent processing is performed on the traversed words.

As shown in FIG. 4B, in this embodiment of the present disclosure, the automatic construction of the attack word library is implemented based on the sample attack records, the attack keywords in the alarm records are determined by screening out a number of words with the highest actual importance in the attack word library, and the accuracy of the determined attack keywords can be effectively improved.

Figure 4C:
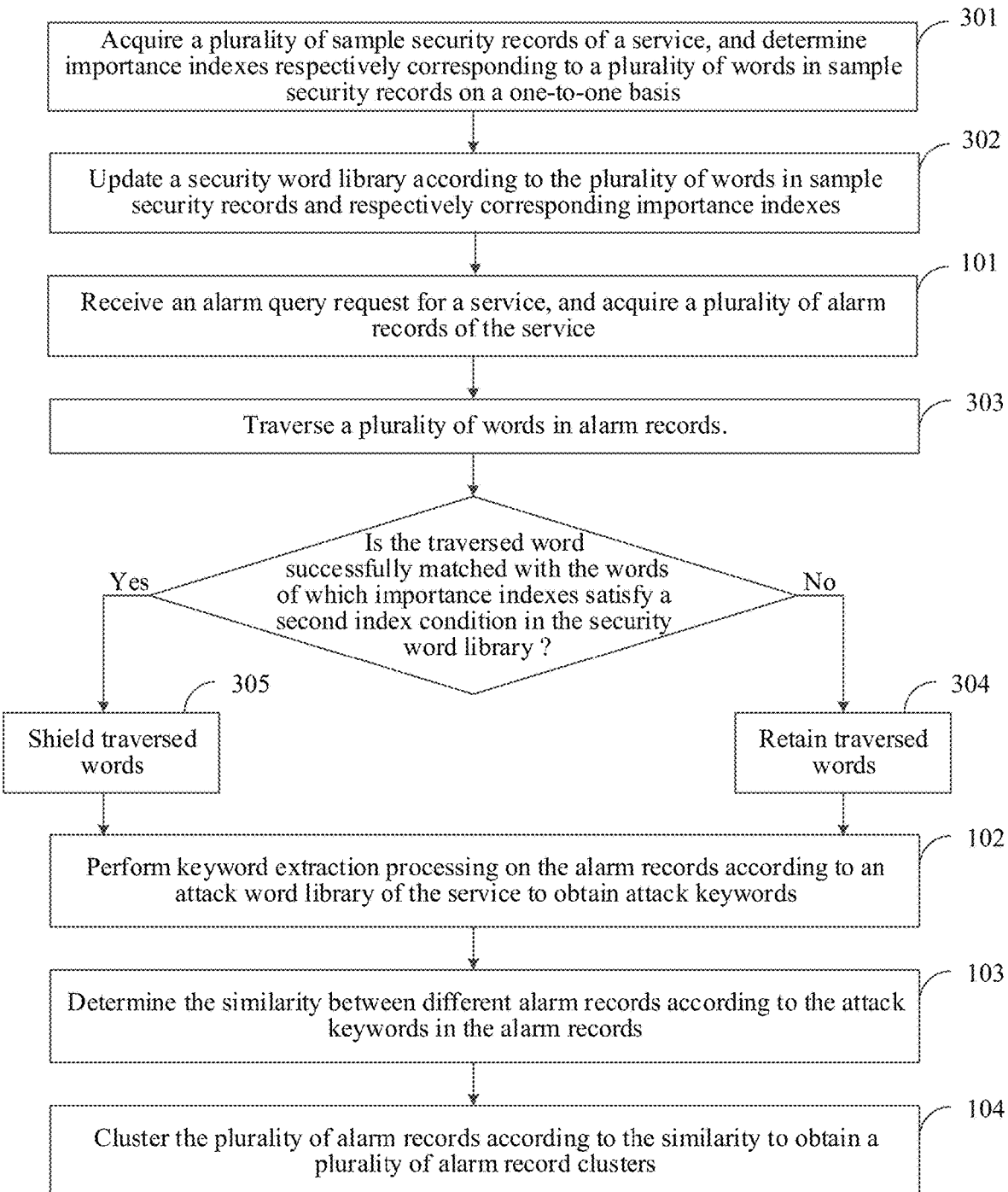
FIG. 4C is a schematic flowchart of an alarm processing method provided by an embodiment of the present disclosure.

In some embodiments, referring to FIG. 4C, FIG. 4C is a schematic flowchart of the alarm processing method provided by an embodiment of the present disclosure, based on FIG. 4A, before step 101, a plurality of sample security records of the service can also be acquired in step 301, and importance indexes corresponding to a plurality of words in the sample security records on a one-to-one basis can be determined.

In this embodiment of the present disclosure, in addition to the attack word library, a security word library may be constructed. For example, a plurality of sample security records of the service may be acquired, where the sample security records may be records marked as having no attack on the service. For each sample security record, preprocessing and word segmentation processing are performed on the sample security record, and the importance indexes respectively corresponding to a plurality of words obtained by the word segmentation processing are determined; and as an example, the method for determining the importance indexes is similar to the method in step 201.

Step 301 may also be performed upon receipt of the alarm query request for the service, and is not limited to the example of FIG. 4C.

In step 302, update the security word library according to the plurality of words in the sample security records and the importance indexes corresponding to the plurality of words in the sample security records on a one-to-one basis.

For each sample security record, the plurality of words in the sample security records and their corresponding importance indexes are added to the security word library to realize the update of the security word library. Likewise, as an example, the sample security records can also be continuously obtained to achieve continuous update of the security word library.

In FIG. 4C, based on FIG. 4A, after step 101, the plurality of words in the alarm records may also be traversed in step 303.

As an example, after the plurality of alarm records of the service are acquired, for each alarm record, preprocessing and word segmentation processing can be performed, and the plurality of words obtained by the word segmentation processing can be traversed.

In step 304, retain the traversed words when the traversed words fail to be matched with the words of which the importance indexes satisfy the second index condition in the security word library.

As an example, the words in the alarm records are filtered according to the plurality of words of which the importance indexes satisfy an index condition (named as a second index condition for the convenience of distinguishing) in the security word library (which may refer to the security word library updated in step 302), where the second index condition has the same principle as the above-mentioned first index condition, and represents that the second index condition is used for screening out the plurality of words with the highest actual importance in the security word library, and the plurality of words screened out is determined as having no attack on the service.

For the traversed words in the alarm records, the traversed words are respectively matched with the plurality of words screened out in the security word library, when the traversed words fail to be matched with all the words screened out in the security word library, it is proved that the traversed words may have aggressiveness, and therefore the traversed words are retained.

In step 305, shield the traversed words when the traversed words are successfully matched with the words of which the importance indexes satisfy the second index condition in the security word library.

As an example, when the traversed words are matched successfully with a certain word screened out in the security word library (which may refer to the security word library updated in step 302), it is proved that the traversed words have no aggressiveness, so the traversed words are shielded, for example, the traversed words are filtered out.

In addition to filtering the words in the acquired alarm records according to the words of which the importance indexes satisfy the index condition in the security word library, the words in the acquired sample attack records can also be filtered so as to reduce the calculation amount for constructing the attack word library according to the sample attack records.

As shown in FIG. 4C, in this embodiment of the present disclosure, the automatic construction of the security word library is implemented based on the sample security records, and the words in the alarm records are filtered based on the words of which the importance indexes satisfy the second index condition in the security word library so as to reduce the calculation amount for subsequent keyword extraction processing.

Figure 4D:
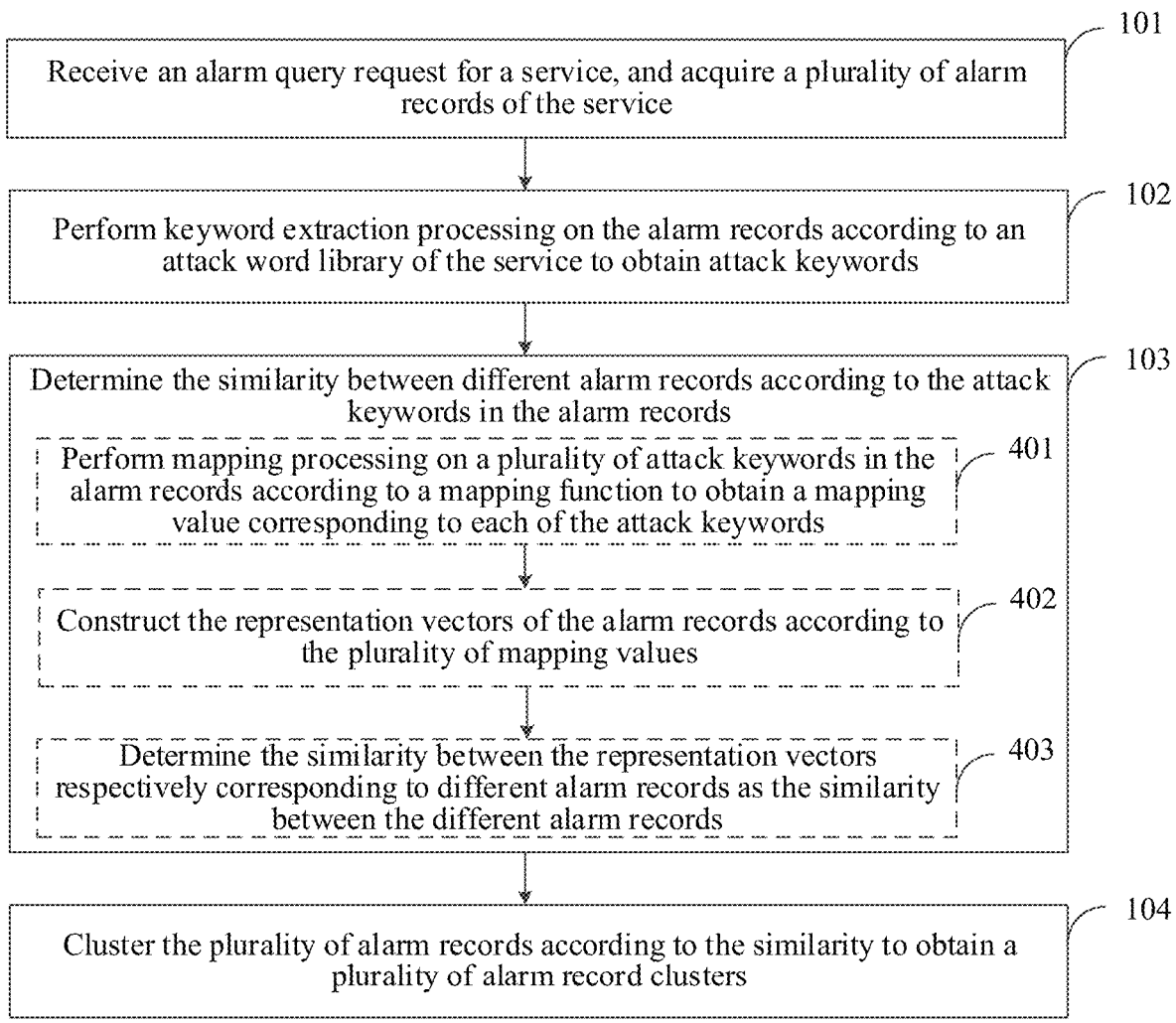
FIG. 4D is a schematic flowchart of an alarm processing method provided by an embodiment of the present disclosure.

In some embodiments, referring to FIG. 4D, FIG. 4D is a schematic flowchart of the alarm processing method provided by an embodiment of the present disclosure, step 103 shown in FIG. 4A may be implemented by performing steps 401 through 403 for every two alarm records, which will be described in connection with the steps.

In step 401, perform mapping processing on the plurality of attack keywords in the alarm records respectively according to a mapping function to obtain mapping values corresponding to each attack keyword.

In addition to determining the similarity between different alarm records based on the Jaccard coefficient principle, in this embodiment of the present disclosure, all the attack keywords in the alarm records can also be mapped respectively according to the mapping function to obtain the mapping value corresponding to each attack keyword. The mapping function may be a Hash function for mapping uniformly and randomly within a set range of values.

In step 402, construct representation vectors of the alarm records according to a plurality of mapping values.

As an example, the representation vector of the alarm records is constructed by the plurality of mapping values, and the representation vector is a dimension-reduced representation of the alarm records.

In some embodiments, the above-mentioned construction of the representation vector of the alarm records according to the plurality of mapping values may be realized in the following way: performing any one of the following processing: performing numerical value-based ascending sorting processing on the plurality of mapping values, and constructing the representation vector of the alarm records by the plurality of mapping values which are consistent with a number set value and sorted top; and constructing the representation vector of the alarm records according to a mapping value corresponding to a minimum numerical value among a plurality of numerical values corresponding to a plurality of mapping functions on a one-to-one basis, where the total number of the mapping functions is equal to the number threshold.

The embodiments of the present disclosure provide two methods for constructing the representation vector. The first method is to construct the representation vector of the alarm records according to a plurality of mapping values of which the numerical value is the minimum and the number meets a number set value in the case where only one mapping function is included after obtaining the mapping values respectively corresponding to a plurality of attack keywords in the alarm records according to the mapping function, For example, if the mapping values obtained according to the mapping function include 1, 2, 1 and 3, and the number threshold is 3, the constructed representation vector is [1, 2, 1]. The first method requires less computation and can quickly construct the representation vector.

The second method is to construct a representation vector of the alarm records according to a mapping value of which the numerical value is minimum corresponding to each mapping function in a case where the number of the mapping functions is equal to the number threshold after obtaining the mapping values respectively corresponding to the plurality of attack keywords in the alarm records according to the mapping functions. For example, if there are three mapping functions, and the corresponding mapping value with the minimum numerical value is 1, 2 and 1 respectively, the constructed representation vector is [1, 2, 1]. A more accurate representation vector can be obtained by the second method.

In step 403, determine the similarity between the representation vectors corresponding to the two alarm records as the similarity between the different alarm records.

For example, the similarity between the representation vector corresponding to the alarm record 1 and the representation vector corresponding to the alarm record 2 is determined as the similarity between the alarm record 1 and the alarm record 2. The manner of determining the similarity between the representation vectors is not limited, for example, the similarity between the representation vectors may be a cosine similarity or a Jaccard coefficient, etc.

Compared with the alarm record itself, the dimension of the representation vector is smaller, so the calculation amount of determining the similarity between the representation vectors is smaller, and rapid determination can be quickly achieved. At the same time, the representation vectors are dimension-reduced representations of the alarm records, so the similarity between the representation vectors can be approximately equal to the similarity between the alarm records corresponding to the representation vectors.

As shown in FIG. 4D, in this embodiment of the present disclosure, the representation vector of the alarm record is constructed through mapping, and the similarity between the representation vectors respectively corresponding to different alarm records is used as the similarity between the different alarm records, which can greatly improve the computational efficiency of similarity.

Figure 4E:
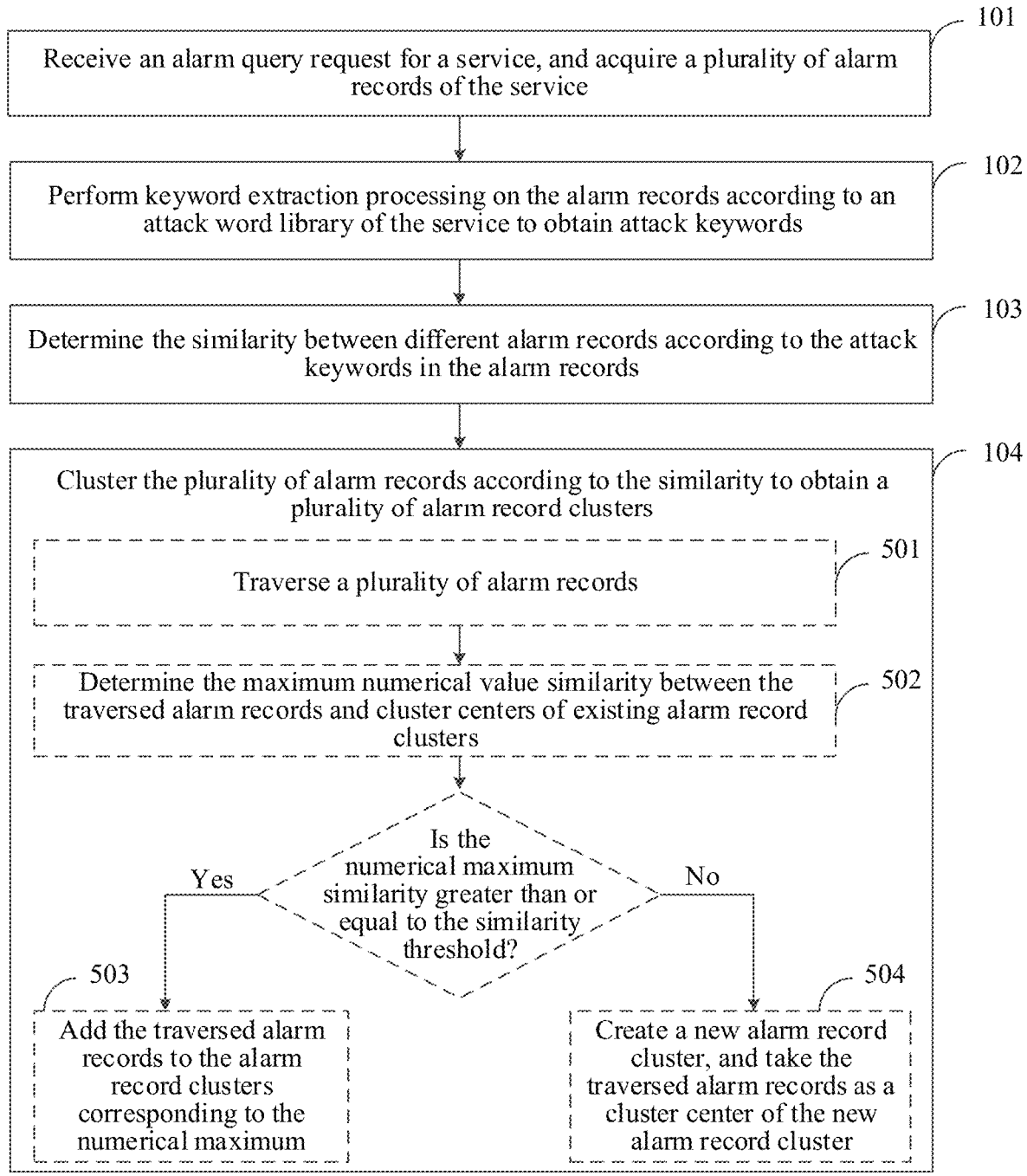
FIG. 4E is a schematic flowchart of an alarm processing method provided by an embodiment of the present disclosure.

In some embodiments, referring to FIG. 4E, FIG. 4E is a schematic flowchart of the alarm processing method provided by an embodiment of the present disclosure, step 104 shown in FIG. 4A may be implemented by steps 501 through 504, which will be described in connection with the steps.

In step 501, traverse a plurality of alarm records.

As an example, an example way of traversal processing is provided, and firstly, a plurality of alarm records are traversed.

In step 502, determine the numerical maximum similarity between the traversed alarm records and the cluster centers of the existing alarm record clusters.

As an example, the similarity between the traversed alarm records and the cluster center of each existing alarm record cluster is respectively determined, and the numerical maximum similarity therein is determined. When there is no alarm record cluster, the numerical maximum similarity can be set to zero.

In step 503, add the traversed alarm records to the alarm record clusters corresponding to the numerical maximum similarity when the numerical maximum similarity is greater than or equal to the similarity threshold.

As an example, when the numerical maximum similarity is greater than or equal to the set similarity threshold, the traversed alarm records are added to the alarm record clusters corresponding to the numerical maximum similarity, and the next alarm record is traversed.

In step 504, when the numerical maximum similarity is less than the similarity threshold, create a new alarm record cluster, and take the traversed alarm records as a cluster center of the new alarm record cluster.

As an example, when the numerical maximum similarity is less than the similarity threshold, a new alarm record cluster is created and the traversed alarm records are added to the new alarm record cluster. The cluster center of each alarm record cluster may be the first alarm record added to the alarm record cluster.

In some embodiments, when the alarm query request includes a similarity threshold, the method further includes: responding to the alarm query request according to a plurality of alarm record clusters corresponding to the similarity threshold in the alarm query request.

In this embodiment of the present disclosure, the similarity threshold may be carried in the alarm query request, and after clustering is performed according to the similarity threshold in the alarm query request, the alarm query request is responded to according to the obtained multiple alarm record clusters.

The other way is to obtain a set similarity threshold list, and for each similarity threshold in the similarity threshold list, a plurality of corresponding alarm record clusters are respectively determined. Thus, after the similarity threshold in the alarm query request is obtained, the alarm query request can be responded to directly according to the plurality of alarm record clusters corresponding to the similarity thresholds without calculation, which increases the response speed. A selection option for the similarity thresholds may be provided in the alarm query interface, so that relevant personnel select the desired similarity threshold to add to the alarm query request.

As shown in FIG. 4E, in this embodiment of the present disclosure, single-pass clustering is implemented through traversal processing, which can improve the efficiency of clustering processing and quickly and accurately obtain the plurality of alarm record clusters.

Figure 4F:
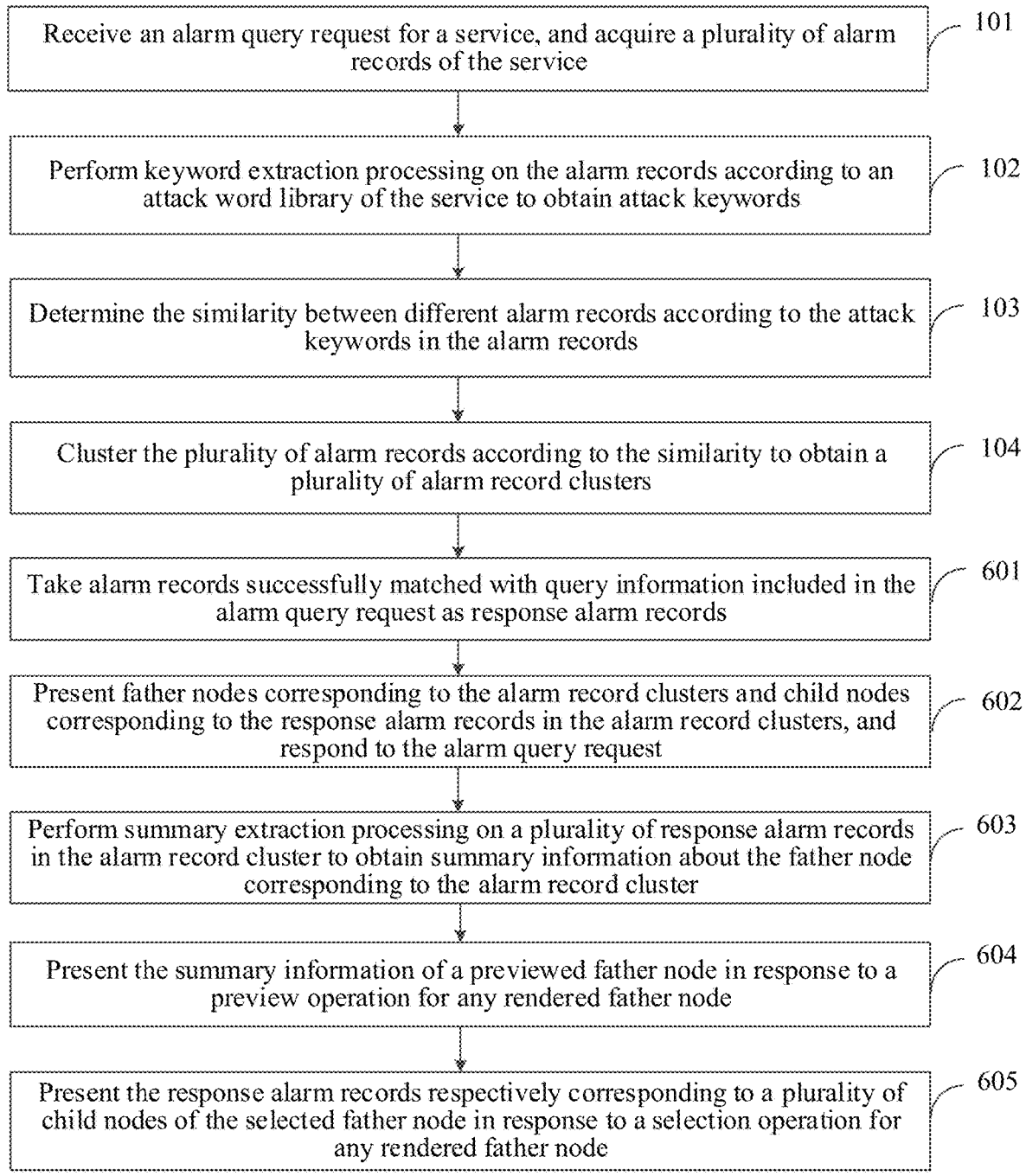
FIG. 4F is a schematic flowchart of an alarm processing method provided by an embodiment of the present disclosure.

In some embodiments, referring to FIG. 4F, FIG. 4F is a schematic flowchart of the alarm processing method provided by an embodiment of the present disclosure, and after step 104 shown in FIG. 4A, in step 601, an alarm record successfully matched with the query information included in the alarm query request may be used as a response alarm record. The query information includes at least one of an alarm time range, a threat level, a result of whether the response processing has been performed, and a result of whether an alarm is false.

As an example, record information of each alarm record may be obtained, and may include the alarm time, threat level, results of whether the response processing has been performed, and results of whether an alarm is false.

In the case where the alarm query request includes query information, the alarm record that matches the record information with the query information successfully is taken as the response alarm record, where the query information, similar to retrieval conditions, may include at least one of the alarm time range, the threat level, the result of whether the response processing has been performed, and a result of whether an alarm is false. The threat level can be set according to actual application scenarios, such as including low-risk, medium-risk, high-risk and fatal, and the threat level in recorded information can be determined manually or automatically through a corresponding threat level determination policy.

For example, in the case where the query information is an alarm time range, when the alarm time in the record information falls within the alarm time range in the query information, it is determined that the alarm time in the recorded information is matched with the alarm time range in the query information successfully (representing that the record information is matched with the query information successfully); In the case where the query information is a threat level, when the threat level in the recorded information is the same as a certain threat level in the query information, it is determined that the threat level in the recorded information is successfully matched with the threat level in the query information, where the query information may include at least one threat level; In the case where the query information is the result of whether the response processing has been performed, when the result of whether the response processing has been performed in the recorded information is the same as the result of whether the response processing has been performed on the query information, it is determined that whether the result of whether the response processing has been performed in the recorded information is successfully matched with the result of whether the response processing has been performed in the query information, where the query information may include at least one of the result of the response processing having been performed and the result of no response processing; In the case where the query information is the result of whether an alarm is false, when the result of whether an alarm is false in the recorded information is the same as the result of whether an alarm is false in the query information, it is determined whether the result of whether an alarm is false in the recorded information is matched successfully with the result of whether an alarm is false in the query information, where the query information may include at least one of the result of the false alarm and the result of the non-false alarm.

In the case where the query information includes the alarm time range, the threat level, the result of whether the response processing has been performed, and the result of whether an alarm is false, when the recorded information is successfully matched with the plurality of information in the query information, it is determined that the recorded information is successfully matched with the query information. In addition, the recorded information and the query information may further include a result of not confirming whether the alarm is false.

In step 602, present father nodes corresponding to the alarm record clusters and child nodes corresponding to the response alarm records in the alarm record clusters, and respond to the alarm query request based on the presented father nodes and child nodes, For example, after the response alarm records are screened out from all the acquired alarm records, the father nodes corresponding to the alarm record clusters and the child nodes respectively corresponding to all the response alarm records in the alarm record clusters are presented in the alarm query interface so as to respond to the alarm query request. Thus, the child nodes presented are able to adapt to the query information in the alarm query request.

Figure 4G:
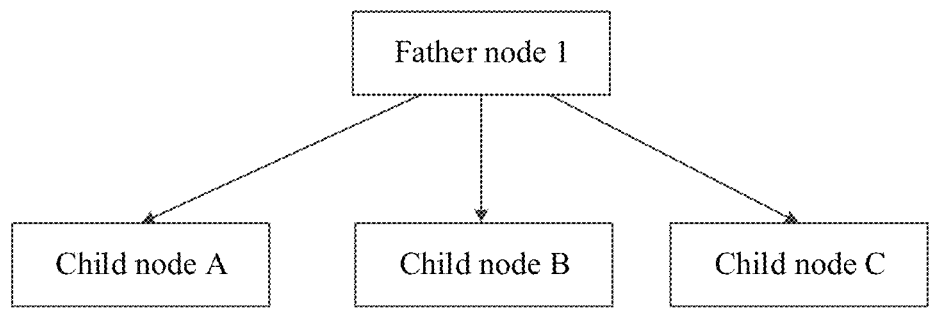
FIG. 4G is a schematic diagram of a visual presentation provided by an embodiment of the present disclosure.
Figure 4H:
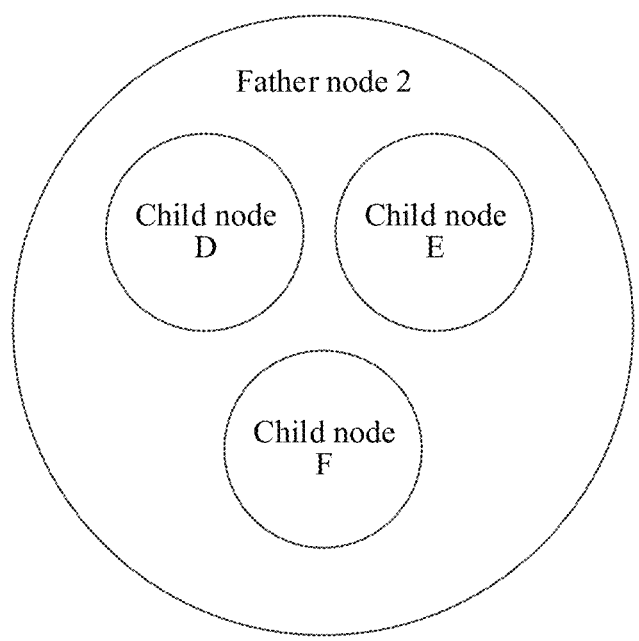
FIG. 4H is a schematic diagram of a visual presentation provided by an embodiment of the present disclosure.

The presentation manners of the father node and the child node are not limited in this embodiment of the present disclosure, and any presentation manner which can reflect the differences between the father node and the child node can be applied in this embodiment of the present disclosure. For example, the father nodes and the child nodes can be presented in the form of a tree diagram, and as shown in FIG. 4G, child nodes of a father node 1 include child nodes A, B and C, where the size of the father node is the same as the size of the child node (for example, presentation parameters are the same); As another example, the father nodes and the child nodes may be presented in the form of a cell graph, and as shown in FIG. 4H, child nodes of a father node 2 include child nodes D, E, and F, where the size of the father node is larger than the size of the child node.

In some embodiments, the above-mentioned presentation of the father nodes corresponding to the alarm record clusters and the child nodes corresponding to the response alarm records in the alarm record clusters can be realized in this way: presenting the father nodes corresponding to the alarm record clusters and the child nodes corresponding to the response alarm records in the alarm record clusters via different presentation parameters, where the presentation parameters include at least one of color and size.

As an example, for any alarm record cluster obtained by clustering processing, the father nodes corresponding to the alarm record clusters and the child nodes corresponding to the response alarm records in the alarm record clusters can be presented via different presentation parameters, and the presentation parameters of the father node are different from the presentation parameters of the child node, where the presentation parameters include at least one of color and size. Thus, the difference between the father node and the child node can be clearly reflected, which is convenient for a user to distinguish.

The presentation parameters of different father nodes may be the same or different, for example, the colors of all the father nodes are the same, but the sizes of the father nodes are determined according to the number of the corresponding child nodes (for example, the sizes of the father nodes are positively correlated with the number of the corresponding child nodes). Similarly, the presentation parameters of different child nodes may be the same or different, for example, all the child nodes have the same size but different colors.

In some embodiments, the above-mentioned presentation of the father nodes corresponding to the alarm record clusters and the child nodes corresponding to the response alarm records in the alarm record clusters via different presentation parameters can be realized in this way: presenting the father nodes corresponding to the alarm record clusters according to the sizes of the father nodes; and presenting the child nodes corresponding to the response alarm records in the alarm record clusters in the father nodes according to the sizes of the child nodes, where the size of the father node is different from the size of the child node.

As an example, for any alarm record cluster, the father node corresponding to the alarm record cluster may be presented according to the size of the father node, while the child nodes corresponding to the response alarm records in the alarm record cluster are presented within the father node according to the sizes of the child nodes, as shown in FIG. 4H. The size of the father node is different from the size of the child node, for example, the size of the father node may be greater than the size of the child node. In this embodiment of the present disclosure, the size of the father node and the size of the child node may be set in advance, or may be automatically determined by other manners.

In some embodiments, before the father nodes corresponding to the alarm record clusters are presented according to the size of the father node, the method further includes the following step: determining the size of the father nodes corresponding to the alarm record clusters according to the number of the response alarm records in the alarm record clusters and the size of the child nodes corresponding to the response alarm records, where the sizes of the child nodes corresponding to different response alarm records are the same.

As an example, the sizes of the child nodes may be preset in advance, and the sizes of different child nodes is the same. In this case, for any alarm record cluster, the size of the father node corresponding to the alarm record cluster can be determined according to the number (total number) of the response alarm records in the alarm record cluster and the sizes of the child nodes, where the size of the father node corresponding to the alarm record cluster is positively correlated with the number of the response alarm records in the alarm record cluster (the number of the response alarm records is the number of the child nodes).

For example, for any alarm record cluster, uniform distribution processing can be performed on the plurality of child nodes corresponding to the alarm record cluster, and the total size occupied by the plurality of child nodes after uniform distribution processing is taken as the size of the father node; and as an example, in the plurality of child nodes after uniform distribution processing, the distance between any two adjacent (referring to positions being adjacent at the time of presentation)) child nodes is a set distance. On this basis, in order to improve the presentation effect, the total size can be expanded (e.g., multiplying the total size by a setting coefficient such as 1.5), and the expanded total size is taken as the size of the father node. In this way, the automatic determination of the size of the father node can be achieved, and the father node can simultaneously accommodate all the corresponding child nodes.

The shapes of the child node and the father node are not limited in this embodiment of the present disclosure, for example, the child node and the father node may both be circular, then the size of the child node may refer to the radius or diameter of the child node, and the size of the father node is in the same way.

In some embodiments, the above-mentioned presentation of the child nodes corresponding to the response alarm records in the alarm record clusters in the father node can be realized in this way: performing any one of the following processing: presenting a plurality of child nodes subjected to uniform distribution processing in a father node; and presenting a plurality of child nodes subjected to uniform distribution processing and random offset processing in the father node.

As an example, a plurality of child nodes subjected to uniform distribution processing can be presented in a father node, and a plurality of child nodes subjected to uniform distribution processing and random offset processing can also be presented in the father node. With regard to each child node, the random offset processing may refer to moving a random distance in a random direction on the basis of the uniform distribution processing, and the random distance may be obtained by randomly taking a value in the range of (0, ½ of a set distance), and the set distance is a distance used for the uniform distribution processing; certainly, this does not constitute a limit to the uniform distribution processing and the random offset processing. In this way, the flexibility of presentation can be improved, and a specific method can be selected according to actual requirements.

In some embodiments, when the father nodes corresponding to the alarm record clusters and the child nodes corresponding to the response alarm records in the alarm record clusters are presented, the method further includes the following step: acquiring threat levels of the response alarm records corresponding to the child nodes, and present the child nodes corresponding to different threat levels via different presentation parameters, where the presentation parameters include at least one of color and size.

As an example, the threat levels of the response alarm records corresponding to the child nodes can also be acquired, the acquisition operation as an example can be performed simultaneously when the alarm records are acquired, and can also be performed when the child nodes need to be presented, and the execution time is not limited. When the child nodes are presented, the child nodes corresponding to different threat levels are presented by different presentation parameters, which may be different sizes or different colors, etc. For example, the child nodes corresponding to different threat levels may be presented by different colors. By using the above-mentioned method, the child nodes corresponding to different threat levels can be distinguished at the visual level, and the degree of distinction can be significantly improved.

In FIG. 4F, after step 602, summary extraction processing may also be performed on the plurality of response alarm records in the alarm record clusters to obtain summary information about the father nodes corresponding to the alarm record clusters in step 603.

As an example, the type of summary information is not limited, for example, including, but not being limited to the type of cluster attack types of the alarm record clusters, the number of the alarm record cluster in all the alarm record clusters, the total number of all the alarm records included in the alarm record clusters, and the type of source IP address in all the alarm records included in the alarm record clusters. The summary information can reflect the general situation of the alarm record clusters, which is helpful for relevant personnel to understand.

Step 603 may be performed after step 602, or at other times, such as after step 601 and before step 602.

In step 604, present the summary information of a previewed father node in response to a preview operation for any presented father node.

The preview operation is not limited in this embodiment of the present disclosure, for example, it may be an operation in which a cursor (e.g., mouse pointer) moves to any father node. When a preview operation for any presented father node is received in the alarm query interface, the summary information of the previewed father node is presented, for example, in the previewed father node, so that relevant personnel determine whether to further perform a selection operation.

In some embodiments, the summary information of each father node may also be presented simultaneously when the father nodes corresponding to the alarm record clusters and the child nodes corresponding to the response alarm records in the alarm record clusters are presented.

In step 605, present the response alarm records corresponding respectively to the plurality of child nodes in the selected father node in response to a selection operation for any presented father node.

As an example, the selection operation is likewise not limited, for example, it may be a click operation or a long press operation, etc. When the selection operation for any presented father node is received in the alarm query interface, the response alarm records corresponding respectively to the plurality of child nodes in the selected father node are presented for viewing by relevant personnel.

As shown in FIG. 4F, in this embodiment of the present disclosure, the response alarm records are filtered out according to query information, which can improve the accuracy of the response; and by presenting the father nodes and the child nodes, and presenting corresponding information when the preview operation and the selection operation are received, the effect of visual presentation can be improved, which is convenient for relevant personnel to perform alarm operation.

In the following, exemplary applications in this embodiment of the present disclosure in a practical application scenario will be described. In this embodiment of the present disclosure, clustering processing based on machine learning is performed on a plurality of alarm data (corresponding to the above alarm records) according to the attack manipulation library (corresponding to the above attack word library) to obtain a plurality of clusters (corresponding to the above alarm record clusters). The obtained multiple clusters can be visually presented by using a cell graph, for example, the father nodes corresponding to the clusters, and leaf nodes (the leaf nodes are the child nodes) corresponding to the alarm data within the clusters are presented, the more the leaf nodes within the father node, the larger the size of the father node. Furthermore, the leaf nodes corresponding to different threat levels may also be distinguished by different colors. For thousands of alarm data, after cluster processing, relevant personnel (such as operators) of the service only need to process a few clusters, for example, clusters with a high threat level and a larger scale can be preferentially processed, which can greatly improve the efficiency of alarm operation.

Figure 5:
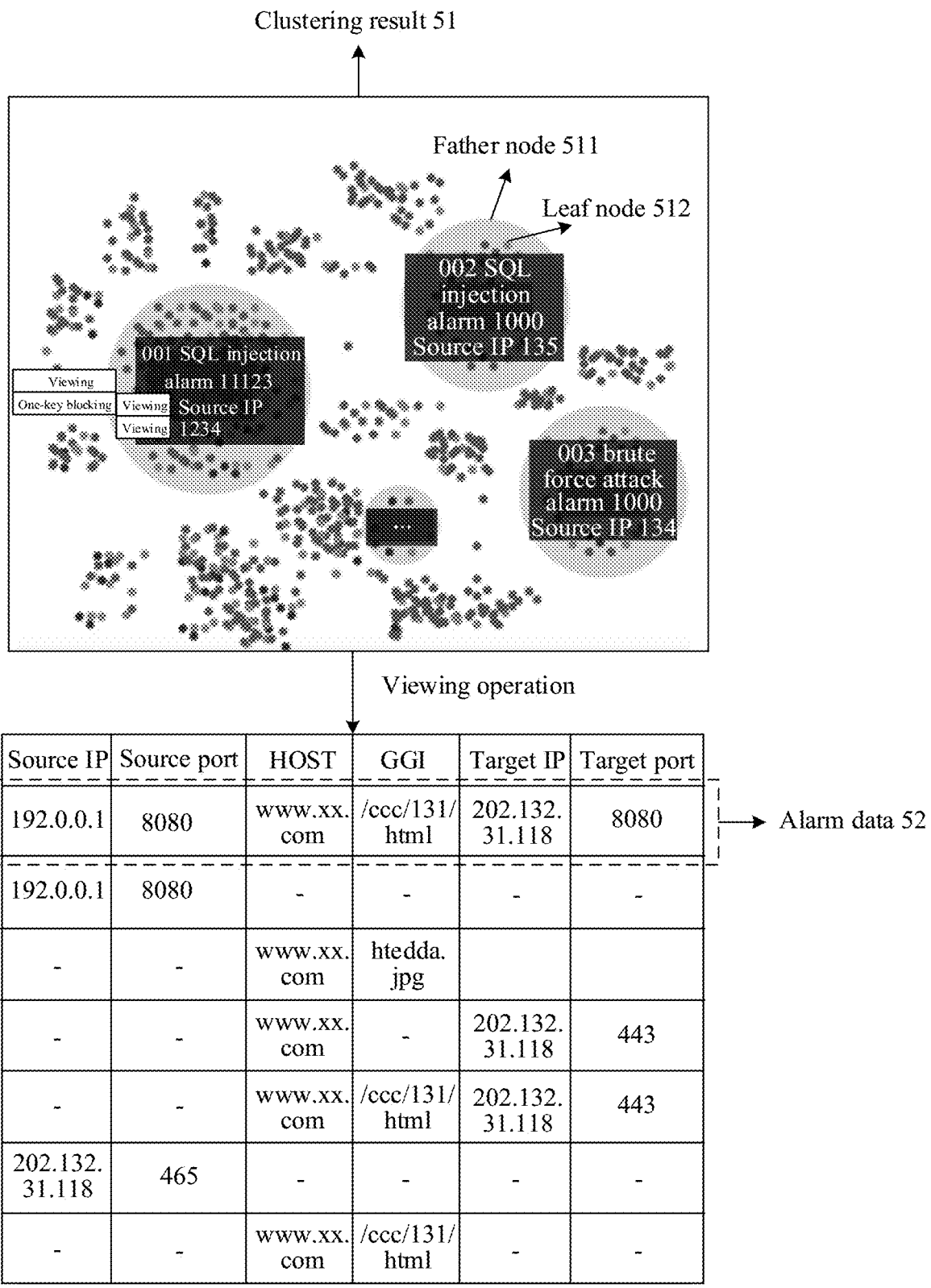
FIG. 5 is a schematic diagram of clustering results provided by an embodiment of the present disclosure.

As an example, this embodiment of the present disclosure provides a visual schematic diagram of a clustering result as shown in FIG. 5; in the clustering result 51, a father node 511 and a leaf node 512 are exemplarily shown, and the father node 511 internally presents summary information, where "002" refers to the numbering of clusters corresponding to the father node 511 in all the clusters; "SQL injection" refers to a cluster attack method (corresponding to the above-mentioned cluster attack type) of the clusters corresponding to the father node 511; "alarm: 1000" means that the total number of the leaf nodes included in the father node 511 is 1000; "source IP: 135" means that there are a total of 135 different source IP addresses in the alarm data respectively corresponding to all the leaf nodes included in the father node 511. The meaning of summary information in the other father nodes included in the clustering result 51 can be analogized.

In the clustering result 51, a viewing option respectively corresponding to the father node and the leaf node is also provided, and when a triggering operation (corresponding to the above selection operation for the father node) on the viewing option corresponding to the father node is received, the alarm data corresponding to the leaf nodes included in the father node is presented. The alarm data is not limited in this embodiment of the present disclosure; and as shown in the alarm data 52 in FIG. 5, the content thereof may include a source IP address, a source port, a HOST address, a public gateway interface (CGI), a target IP address, a target port and a virtual private cloud (VPC) identification. In addition, in the clustering result 51, a one-key blocking option (also referred to as a one-key forbidden option) corresponding to the father node is also provided; when a triggering operation for the one-key blocking option corresponding to the father node is received, a blocking operation is performed on the alarm data respectively corresponding to all the leaf nodes included in the father node; and the blocking operation intercepts subsequent request data complying with the source IP address, for example, according to the source IP address in the alarm data. Certainly, in this embodiment of the present disclosure, the blocking operation may also be supported for one or more specific leaf nodes.

Figure 6A:
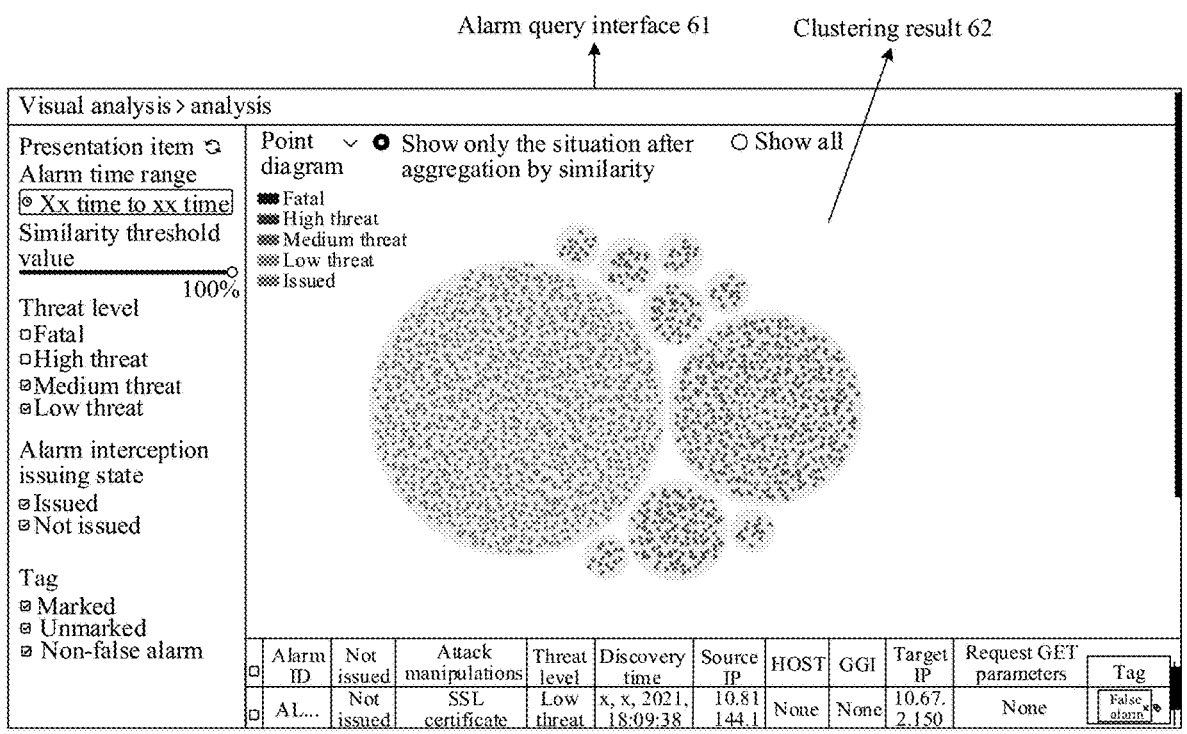
FIG. 6A is a schematic diagram of an alarm query interface provided by an embodiment of the present disclosure.

As an example, the embodiments of the present disclosure provide a visual schematic diagram of the alarm query interface as shown in FIG. 6A. In the alarm query interface 61 shown in FIG. 6A, a corresponding clustering result, such as the shown clustering result 62, can be presented according to a presentation item (corresponding to the above query information), where the presentation item includes but is not limited to an alarm time range, a similarity threshold, a threat level, an alarm interception issuing state (corresponding to the above result of whether the response processing has been performed) and a label (corresponding to the above result of whether an alarm is false). The alarm interception issuing state of the alarm data refers to a state of whether to intercept a request initiated by the source IP address in the alarm data, "issued" refers to intercepting, and "not issued" refers to no intercepting; The label is used for marking the alarm data, for example, "marked" means that the corresponding alarm data belongs to a false alarm (false alarm), "not marked" means that it has not been determined whether the corresponding alarm data belongs to a false alarm (corresponding to the above result of not confirming whether the alarm is false), and "non-false alarm" means that the corresponding alarm data does not belong to a false alarm. The relevant personnel of the service can adjust the presentation items according to their own requirements, so that the electronic device can screen out the contents most concerned by the relevant personnel from the clustering result and present the contents. Certainly, in this embodiment of the present disclosure, all the alarm data can be directly presented without clustering processing, for example, in the form of a list or other forms upon receiving a triggering operation for the "all present" option in FIG. 6A.

Figure 6B:
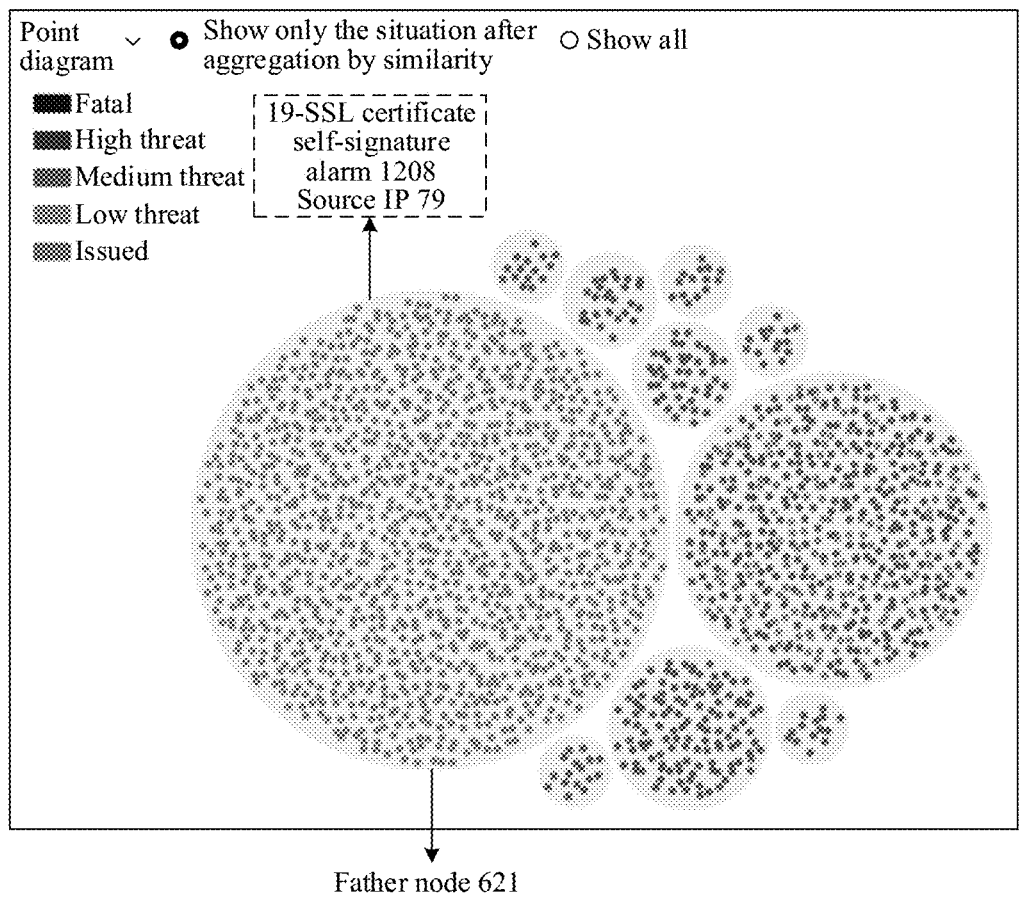
FIG. 6B is a schematic diagram of summary information in an alarm query interface provided by an embodiment of the present disclosure.

A plurality of father nodes are shown in the clustering result 62, and when a preview operation is received for any one of the father nodes, such as moving the cursor into the father node, the summary information of the previewed father node is presented. In FIG. 6B, taking the previewed father node as the father node 621 as an example, the summary information of the father node 621 is shown. In the summary information, the numbering of the cluster corresponding to the father node 621 is 19, a cluster attack manipulation is self-signature of a secure socket layer (SSL) certificate, the number of the alarm data in the cluster is 1208, and the number of source IP addresses of the alarm data in the cluster is 79 in total.

Figures 6C, 7:
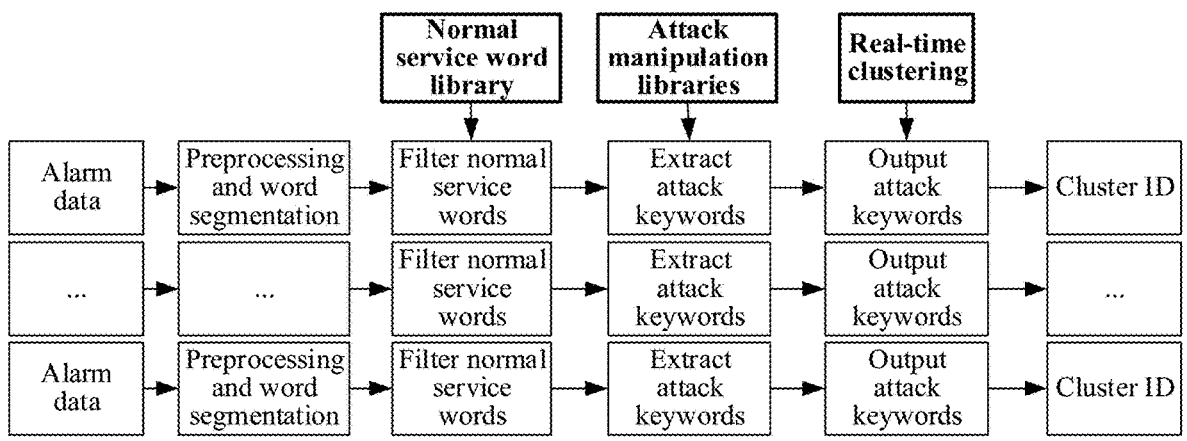
FIG. 6C is a schematic diagram of alarm data in an alarm query interface provided by an embodiment of the present disclosure.
FIG. 7 is a diagram of an alarm processing method provided by an embodiment of the present disclosure.

When a selection operation for any presented father node is received, the alarm data corresponding to the leaf nodes included in the selected father node is presented, where the selection operation is like a click operation. In FIG. 6C, it is shown that the contents of the alarm data include an alarm ID, an issuing state (an alarm interception issuing state), an attack manipulation, a threat level, a discovery time (the discovery time being alarm time), a source IP address, a HOST address, a CGI, a target IP address and request GET parameters, where the GET is a request method in HTTP for acquiring data from a server. The alarm data shown in FIG. 6C is merely an example, and other contents in the alarm data, such as attack keywords, etc., may also be presented. For a plurality of alarm data shown, batch processing such as batch interception may be performed, and operations such as tagging may also be performed.

Next, the alarm processing method provided in this embodiment of the present disclosure is explained from the perspective of bottom-level implementation, and a flow chart as shown in FIG. 7 is provided as an example, which is explained in the form of steps for ease of understanding.

(1) Constructing a Normal Service Word Library (Corresponding to the Above Security Word Library).

As an example, the User-Agent (UA) in the HTTP request header is taken as an example to illustrate the process of constructing the normal service word library. For a common user, most of the UAs in the generated sample security data (corresponding to the above sample security records) are similar, and for an attacker, the UA in the generated sample security data (corresponding to the above sample security records) may include a malicious statement, for example, the UA in the sample security data is: Mozilla/5.0 (Windows NT 10.0; Win64; x64) AppleWebKit/537.36 (KHTML, like Gecko) Chrome/66.6.2333.33 Safari/537.36; and the UA in the sample attack data is: ( ) {: ;}; echo; echo ShellShockl/usr/bin/md5sum, ns/1.0.2-beta.

Therefore, in this embodiment of the present disclosure, the plurality of sample security data is acquired, word segmentation processing is performed on UA in each sample security data, the IDF of each word obtained by the word segmentation processing in all the sample security data is calculated, and the IDF as an example corresponds to the above-mentioned importance indexes. The lower the IDF of a word, the higher the frequency of occurrence of the word, and the higher the probability that the word is not aggressive in UA. Then, the obtained plurality of words and the respectively corresponding IDF are used for constructing the normal service word library, and as an example, taking a plurality of sample security data generated on x, x, 2021 (as an example, referring to the same day) as an example, the top 11 words in ascending order of IDF (the ascending order represents the order from low to high) in the constructed normal service word library are shown:

| Date | Words in the normal service word library | IDF |
| --- | --- | --- |
| x, x, 2021 | mozilla | 0.55488562 |
| x, x, 2021 | gecko | 0.60767614 |
| x, x, 2021 | like | 0.60871196 |
| x, x, 2021 | applewebkit | 0.61033326 |
| x, x, 2021 | khtml | 0.61035303 |
| x, x, 2021 | android | 0.62095599 |
| x, x, 2021 | linux | 0.63875796 |
| x, x, 2021 | build | 0.67622404 |
| x, x, 2021 | safari | 0.75235588 |
| x, x, 2021 | mobile | 0.78151983 |
| x, x, 2021 | chrome | 1.06627641 |

Based on the actual situation, it can be verified that these 11 words are normal words in the UA.

(2) Construct an Attack Manipulation Library.

Figure 8:
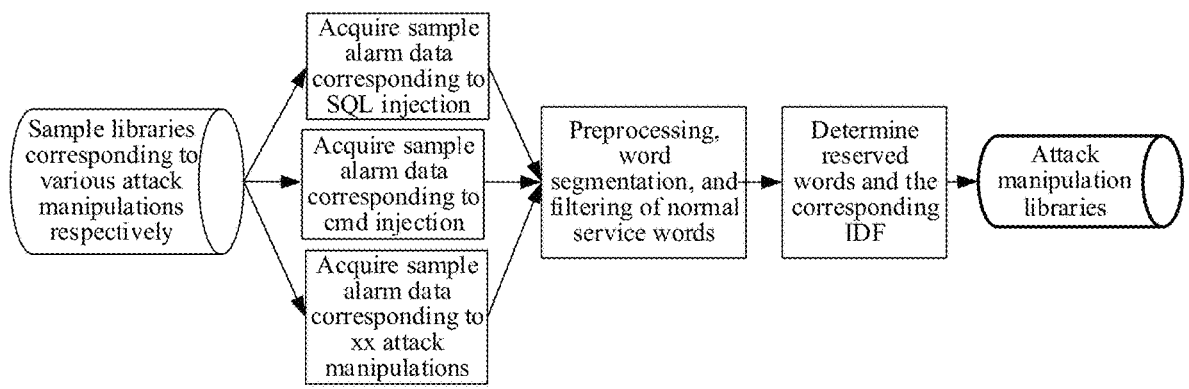
FIG. 8 is a schematic diagram showing the construction process of an attack manipulation library provided by an embodiment of the present disclosure.

As an example, as shown in FIG. 8, the attack manipulation library is constructed according to accumulated sample libraries respectively corresponding to multiple attack manipulations, where the attack manipulations include but are not limited to SQL injection, cmd injection and component vulnerability.

For ease of understanding, the attack manipulation of SQL injection is illustrated as an example. Firstly, a plurality of sample attack data is acquired from the sample library corresponding to SQL injection, and preprocessing, word segmentation processing (taking word segmentation processing on the UA in the sample attack data as an example) and filtering processing are performed on each sample attack data. In the process of filtering processing, top M words in ascending order in the normal service word library are considered as words to be matched (the words to be matched as an example correspond to the above words of which the importance indexes satisfy the second index condition), then the multiple words obtained by word segmentation processing in the UA of the sample attack data are traversed, the traversed words and the multiple words to be matched are respectively subjected to matching processing, and if the matching is successful, it is proved that the traversed words are not dangerous and are filtered, thus the traversed words are shielded; and if matching with the multiple words to be matched fails, the traversed words are retained. M is an integer greater than 1.

For multiple words retained in each sample attack data, the IDF of each word in all the sample attack data corresponding to the attack method of SQL injection is calculated. As an example, the top 10 words in the ascending order of IDF are shown by taking the multiple sample attack data corresponding to the attack manipulation of SQL injection generated on x, x of 2021 (as an example, it refers to the same day) as an example:

| Date | Words in the sample attack data corresponding to the attack manipulation of SQL injection | IDF |
|---|---|---|
| x, x, 2021 | http | 0.1177713 |
| x, x, 2021 | xor | 0.2414353 |
| x, x, 2021 | sleep | 0.2414353 |
| x, x, 2021 | now | 0.2414353 |
| x, x, 2021 | sysdate | 0.2414353 |
| x, x, 2021 | if | 0.2414353 |
| x, x, 2021 | pgv | 0.78721846 |
| x, x, 2021 | s0 | 0.79093978 |
| x, x, 2021 | pvi | 0.79156135 |
| x, x, 2021 | en | 0.8377952 |

For each attack manipulation, the words retained in the sample attack data corresponding to the attack manipulation and the corresponding IDF can be added to the attack manipulation library to construct the attack manipulation library.

(3) Real-Time Clustering.

For newly acquired alarm data, preprocessing, word segmentation processing and filtering processing are also performed thereon. For a plurality of words retained by filtering processing in the alarm data, the attack keywords therein are determined according to the attack manipulation library, for example, top L words in the ascending order in the attack manipulation library are taken as words to be matched (the words to be matched as an example correspond to the above words of which the importance indexes satisfy the first index condition), then the plurality of words retained in the alarm data are traversed, the traversed words and the plurality of words to be matched are respectively subjected to matching processing, and if the matching is successful, it is proved that the traversed words are dangerous, and are taken as the attack keywords; If the matching with the plurality of words to be matched fails, subsequent processing is not performed on the traversed words. L is an integer greater than 1.

After the attack keywords in the alarm data are obtained, the similarity between different alarm data can be calculated based on the Locality Sensitive Hashing (LSH) principle, and the plurality of alarm data are further clustered according to the similarity, which will be described in detail later.

Firstly, the MinHash value of the alarm data is determined according to the attack keywords included in each alarm data, and the representation vectors of the alarm data are constructed according to the MinHash value, where the purpose of the process is to reduce the dimensionality of the alarm data and reduce the subsequent calculation amount, and the MinHash value corresponds to the above numerical minimum mapping value. Then, the similarity between the representation vectors of the different alarm data is taken as the similarity between the different alarm data.

Traversal processing is performed on the plurality of acquired alarm data, the similarity between the traversed alarm data and the cluster center of each existing cluster is determined, and the numerical maximum similarity value therein and a corresponding cluster ID (corresponding to the above numbering) are determined. If the numerical maximum similarity is greater than or equal to a set similarity threshold, the traversed alarm data is added to a cluster corresponding to the numerical maximum similarity; If the numerical maximum similarity is less than the similarity threshold, a new cluster is created, and the traversed alarm data is added to the cluster, where the ID of the cluster is the cluster ID corresponding to the numerical maximum similarity plus one. For the first alarm data traversed, a first cluster may be created directly, the cluster ID of the cluster is set to 1, and the alarm data is added to the cluster. In addition, the cluster center of the cluster may be the first alarm data added to the cluster.

In this way, for a set similarity threshold, a corresponding cluster result may be obtained and includes a plurality of clusters and a plurality of alarm data in each cluster. The process of clustering may be performed in real time to continually add new alarm data to existing clusters or newly created clusters.

In this embodiment of the present disclosure, a preset list of similarity thresholds, such as [1.0, 0.9, 0.8, 0.7, 0.6, 0.5], may be acquired, and the clustering results corresponding to each similarity threshold therein are respectively determined. In this way, if an adjustment operation for the presentation item of the similarity threshold (as shown in FIG. 6A) is received in the alarm query interface, the clustering result corresponding to the adjusted similarity threshold can be presented in real time so as to improve the real-time performance of the response.

(4) Visual Presentation.

In this embodiment of the present disclosure, clustering results may be presented based on the hierarchy layouts of D3js. d3. hierarchy object is a data structure capable of expressing a hierarchical relationship, and examples thereof are as follows:

```
{"name": "A1",
  "children": [
    {"name": "B1",
      "children": [
        {"name": "C1",
          "value": 100},
          {"name": "C2",
          "value": 300},
        {"name": "C3",
          "value": 200}
      ]},
    {"name": "B2",
      "value": 200}
  ]
}
```

Figure 9:
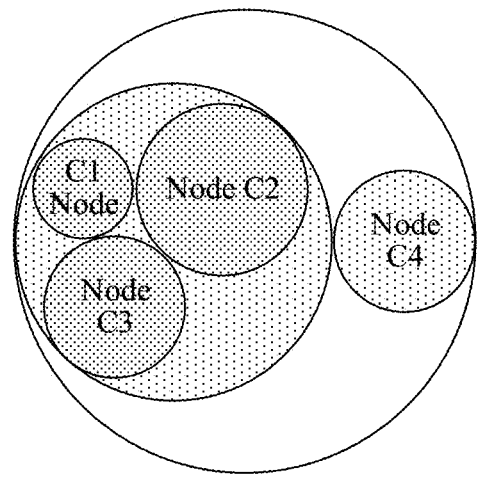
FIG. 9 is a schematic diagram of a visual presentation provided by an embodiment of the present disclosure.

After the definition of the above-mentioned data structure, each node contains information such as a position and a radius (the radius is a value in the above-mentioned data structure), and then different color processing is performed on the father nodes and the leaf nodes, so that a node schematic diagram as shown in FIG. 9 can be drawn, where a node B1 (not shown in FIG. 9) is a father node of a node C1, a node C2 and a node C3; A node A1 (not shown in FIG. 9) is a father node of a node B1 and a node B2.

The above-mentioned d3. hierarchy algorithm can be applied to this embodiment of the present disclosure, for example, the size of each leaf node (corresponding to the above-mentioned size of the child node, specifically, such as a radius or a diameter) can be defined, and the size of the father node can be determined according to the number of the leaf nodes corresponding to the father node and the sizes of the leaf nodes. Then, the father node and the plurality of child nodes within the father node may be drawn. The plurality of leaf nodes drawn by the d3. hierarchy algorithm are uniformly distributed within the father node, the actual presentation effect is stereotyped, and a father node 101 and a leaf node 102 are exemplarily shown in FIG. 10 Therefore, in order to improve the presentation effect, the random offset processing can be performed, i.e. the leaf nodes are randomly offset without exceeding the range of the father node. An example formula for random offset processing is as follows:

translate("((d·x−v[0])*k+random(0−gap,gap))","((d·y−v[1])*k+random(0−gap,gap))")

where translate represents a position transformation function, a first parameter "((d·x−v [0])*k+random (0−gap, gap))" in the translate represents an x-axis offset, a second parameter "((d·y−v [1])*k+random (0−gap, gap))" in the translate represents a y-axis offset, and the unit of the offset can be a pixel, or certainly can be other units; d represents the current leaf node (can be any leaf node); d·x represents an abscissa of the current leaf node; d·y represents an ordinate of the current leaf node; v [0] represents an abscissa of a central position of a graph composed of all father nodes; v [1] represents an ordinate of the center position of the graph; k represents a canvas width/(father node diameter+ margin set in the canvas); gap represents a set distance/2, where the set distance refers to a distance between two adjacent leaf nodes in the case of uniform distribution; and random is a random function, and presents random values taken in the range of 0−gap to gap.

Figure 10:
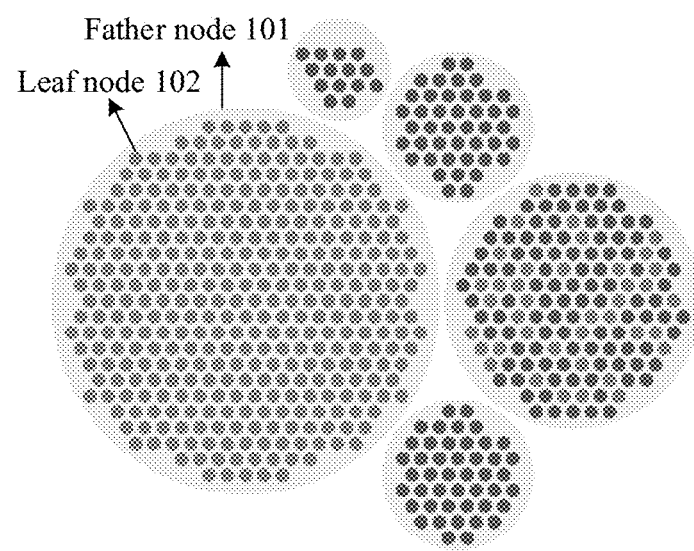
FIG. 10 is a schematic diagram of evenly distributed nodes provided by an embodiment of the present disclosure.
Figure 11:
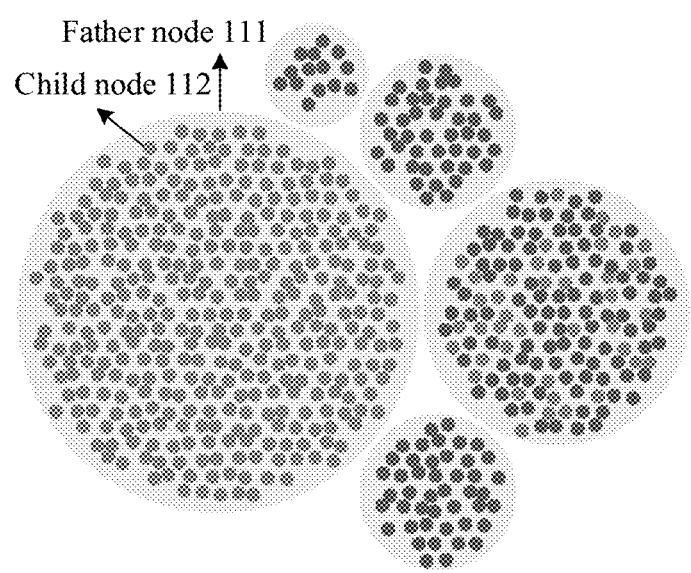
FIG. 11 is a schematic diagram of nodes randomly offset on the basis of even distribution provided by an embodiment of the present disclosure.

After the random offset processing is performed on the clustering result shown in FIG. 10, the obtained clustering result is shown in FIG. 11, in which a father node 111 and a leaf node 112 are exemplarily shown.

According to the embodiments of the present disclosure, at least the following technical effects can be achieved: (1) although most of the alarm data come from different sources, most of them use the existing attack manipulations; after clustering is performed according to the attack manipulation library, the final clustering results are only correlated with the attack manipulations; the clustering results can reflect the core reasons for the occurrence of alarms, and can effectively reduce the difficulty of alarm operation and improve the efficiency of alarm operation; and (2) the process of alarm processing can be implemented in combination with AI automation without relying on expert experience, and the merging policy is determined without relying on human experience, and is adjusted without considering different scenarios.

It is to be understood that in this embodiment of the present disclosure, related data such as user information and user behavior are involved, and when a specific product or technology is applied in this embodiment of the present disclosure, user permission or consent needs to be obtained, and the collection, use and processing of the relevant data need to comply with relevant laws and regulations and standards of relevant countries and regions.

Continuing with the description below of an exemplary structure of the alarm processing apparatus 455 provided by embodiment of the present disclosure implemented as a software module, in some embodiments, as shown in FIG. 3, the software module stored in the alarm processing apparatus 455 of the memory 450 may include: an alarm record acquisition module 4551 configured to receive the alarm query request for the service and acquire the plurality of alarm records of the service; a keyword extraction module 4552 configured to perform keyword extraction processing on the alarm records according to an attack word library of the service to obtain attack keywords; a similarity determination module 4553 configured to determine the similarity between every two of the plurality of alarm records according to the attack keywords in the alarm records; and a response module 4554 configured to cluster the plurality of alarm records according to the similarity to obtain a plurality of alarm record clusters.

In some embodiments, the alarm processing apparatus 455 further includes: an attack record acquisition module configured to acquire a plurality of sample attack records of the service, and determine importance indexes corresponding to a plurality of words in the sample attack records on a one-to-one basis; and an attack word library constructing module configured to update the attack word library according to the plurality of words in the sample attack records and the importance indexes corresponding to the plurality of words in the sample attack records on a one-to-one basis.

In some embodiments, the keyword extraction module 4552 is further configured to: screen out words of which the importance indexes satisfy the first index condition in the attack word library; and perform the following processing for each of the plurality of words in the alarm records: match the words with the plurality of words screened out, and take the words successfully matched as the attack keywords in the alarm records.

In some embodiments, the keyword extraction module 4552 is further configured to: perform descending sorting processing on the plurality of words in the attack word library based on the importance indexes when the importance indexes of the words in the attack word library are positively correlated with the actual importance to obtain the plurality of words sorted top in the attack word library; and perform ascending sorting processing on the plurality of words in the attack word library based on the importance indexes when the importance indexes of the words in the attack word library are negatively correlated with the actual importance to obtain the plurality of words sorted top in the attack word library.

In some embodiments, each sample attack record corresponds to an attack type; the attack record acquisition module is further configured to: traverse a plurality of words in the sample attack records and perform the following processing on the traversed words: determine the total number of a plurality of sample attack records with the same attack type corresponding to the sample attack records, and determine the total number as a first number; determine the number of sample attack records including the traversed words in the plurality of sample attack records with the same attack type corresponding to the sample attack records, and take the determined number as a second number; and determine the importance indexes of the traversed words based on the first number and the second number.

In some embodiments, the response module 4554 is further configured to: for each attack type, take a plurality of words in the sample attack records corresponding to the attack types as the plurality of words corresponding to the attack types; take an attack type corresponding to the attack keyword with the highest occurrence frequency in the alarm record clusters as a cluster attack type corresponding to the alarm record clusters; and respond to the alarm query request according to the plurality of alarm record clusters and the cluster attack types corresponding to the plurality of alarm record clusters on a one-to-one basis.

In some embodiments, the alarm processing apparatus 455 further includes: a filtering module configured to traverse a plurality of words in the alarm records, and perform the following processing on the traversed words: retain the traversed words when the traversed words fail to be matched with the words of which the importance indexes satisfy the second index condition in the security word library; and shield the traversed words when the traversed words are successfully matched with the words of which the importance indexes satisfy the second index condition in the security word library, where the security word library includes a plurality of words and respectively corresponding importance indexes.

In some embodiments, the alarm processing apparatus 455 further includes: a security record acquisition module configured to acquire a plurality of sample security records of the service, and determine importance indexes corresponding to a plurality of words in the sample security records on a one-to-one basis; and a security word library constructing module configured to update the security word library according to the plurality of words in the sample security records and the importance indexes corresponding to the plurality of words in the sample security records on a one-to-one basis.

In some embodiments, the similarity determination module 4553 is further configured to: perform any one of the following processing for every two alarm records: perform vector conversion processing on the attack keywords in the alarm records to obtain representation vectors of the alarm records, and determine the similarity between the representation vectors respectively corresponding to the two alarm records as the similarity between the different alarm records; and determine an intersection and a union between the attack keywords respectively corresponding to the two alarm records, and determine the similarity between the different alarm records based on the number of the attack keywords in the intersection and the number of the attack keywords in the union.

In some embodiments, the similarity determination module 4553 is further configured to: perform mapping processing on a plurality of attack keywords in the alarm records according to a mapping function to obtain a mapping value corresponding to each of the attack keywords, and construct the representation vectors of the alarm records according to the plurality of mapping values.

In some embodiments, the similarity determination module 4553 is further configured to: perform any one of the following processing: perform numerical value-based ascending sorting processing on the plurality of mapping values, and construct the representation vectors of the alarm records by the plurality of mapping values which are consistent with a number set value and sorted top; and construct the representation vector of the alarm records according to a mapping value corresponding to a minimum numerical value among a plurality of numerical values corresponding to a plurality of mapping functions on a one-to-one basis, where the total number of the mapping functions is equal to the number threshold.

In some embodiments, the response module 4554 is further configured to: traverse the plurality of alarm records, and perform the following processing on the traversed alarm records: determine the numerical maximum similarity between the traversed alarm records and cluster centers of existing alarm record clusters; add the traversed alarm records to the alarm record clusters corresponding to the numerical maximum when the numerical maximum similarity is greater than or equal to the similarity threshold; and create a new alarm record cluster, and take the traversed alarm records as a cluster center of the new alarm record cluster when the numerical maximum similarity is less than the similarity threshold.

In some embodiments, the alarm query request includes a similarity threshold; and the response module 4554 is further configured to: respond to the alarm query request according to a plurality of alarm record clusters corresponding to the similarity threshold in the alarm query request.

In some embodiments, the response module 4554 is further configured to: take alarm records successfully matched with query information included in the alarm query request as response alarm records; and present father nodes corresponding to the alarm record clusters and child nodes corresponding to the response alarm records in the alarm record clusters, t respond to the alarm query request based on the presented father nodes and child nodes, where the query information includes at least one of the following: alarm time range, threat level, results of whether the response processing has been performed, and results of whether an alarm is false.

In some embodiments, the response module 4554 is further configured to: present the father nodes corresponding to the alarm record clusters and the child nodes corresponding to the response alarm records in the alarm record clusters via different presentation parameters, where the presentation parameters include at least one of color and size.

In some embodiments, the response module 4554 is further configured to: present the father nodes corresponding to the alarm record clusters according to the sizes of the father nodes; and present the child nodes corresponding to the response alarm records in the alarm record clusters in the father nodes according to the sizes of the child nodes, where the size of the father node is different from the size of the child node.

In some embodiments, the response module 4554 is further configured to: determine the size of the father nodes corresponding to the alarm record clusters according to the number of the response alarm records in the alarm record clusters and the size of the child nodes corresponding to the response alarm records, where the sizes of the child nodes corresponding to different response alarm records are the same.

In some embodiments, the response module 4554 is further configured to: perform any one of the following processing: present a plurality of child nodes subjected to uniform distribution processing in a father node; and present a plurality of child nodes subjected to uniform distribution processing and random offset processing in the father node.

In some embodiments, the response module 4554 is further configured to: perform summary extraction processing on a plurality of response alarm records in the alarm record cluster to obtain summary information about the father node corresponding to the alarm record cluster; present the summary information of a previewed father node in response to a preview operation for any presented father node; and present the response alarm records respectively corresponding to a plurality of child nodes of the selected father node in response to a selection operation for any presented father node.

In some embodiments, the response module 4554 is further configured to: acquire threat levels of the response alarm records corresponding to the child nodes, and present the child nodes corresponding to different threat levels via different presentation parameters, where the presentation parameters include at least one of color and size.

In some embodiments, the alarm processing apparatus 455 further includes: a processing request receiving module configured to receive a response processing request for any one of the alarm record clusters; and a batch processing module configured to perform response processing on the plurality of alarm records in any one of the alarm record clusters, and respond to a response processing request based on a response processing result.

The embodiments of the present disclosure provide a computer program product or a computer program. The computer program product or the computer program includes computer instructions (executable instructions), and the computer instructions are stored in a computer-readable storage medium. A processor of a computer device reads the computer instructions from the computer-readable storage medium, and the processor executes the computer instructions, to cause the computer device to perform the alarm processing method according to the embodiments of the present disclosure.

The embodiments of the present disclosure provide a computer-readable storage medium storing executable instructions. When the executable instructions are executed by a processor, the processor is caused to perform the method provided in the embodiments of the present disclosure, for example, the alarm processing method shown in FIG. 4A, FIG. 4B, FIG. 4C, FIG. 4D, FIG. 4E, and FIG. 4F.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In various embodiments, the term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An alarm processing method, performed by an electronic device, the method comprising:
    acquiring a plurality of sample attack records of a service, and determining importance indexes corresponding to a plurality of words in the sample attack records on a one-to-one basis, the service being an online service provided by one or more servers to users, the plurality of sample attack records comprising at least source Internet Protocol (IP) addresses and request data of attackers;
    updating an attack word library according to the plurality of words in the sample attack records and the importance indexes corresponding to the plurality of words in the sample attack records on a one-to-one basis;
    receiving an alarm query request for the service, and acquiring a plurality of alarm records of the service;
    performing keyword extraction processing on the plurality of alarm records according to an attack word library of the service to obtain attack keywords, comprising:
        screening out multiple words of which the importance indexes satisfy a first index condition in the attack word library; and
        processing a plurality of words in the plurality of alarm records by matching each of the plurality of words with the multiple words from the screening, and using words successfully matched as the attack keywords in the plurality of alarm records;
    determining a similarity between every two of the plurality of alarm records according to the attack keywords in the plurality of alarm records;
    clustering the plurality of alarm records according to the similarity to obtain a plurality of alarm record clusters;
    receiving a response processing request for a target alarm record cluster of the plurality of alarm record clusters, the response processing request comprising a blocking or intercepting request; and
    responding to the response processing request by performing batch blocking or intercepting processing on source IP addresses in the plurality of alarm records in the target alarm record cluster.

2. The method according to claim 1, wherein screening out the multiple words of which the importance indexes satisfy the first index condition in the attack word library comprises:
    when the importance indexes of words in the attack word library are positively correlated with an actual importance, performing descending sorting processing on the plurality of words in the attack word library based on the importance indexes to obtain a plurality of words sorted top in the attack word library; and
    when the importance indexes of the words in the attack word library are negatively correlated with the actual importance, performing ascending sorting processing on the plurality of words in the attack word library based on the importance indexes to obtain a plurality of words sorted top in the attack word library.

3. The method according to claim 1, wherein each of the sample attack records corresponds to an attack type; and determining the importance indexes corresponding to the plurality of words in the sample attack records on the one-to-one basis comprises:
    traversing the plurality of words in the sample attack records, and processing the traversed words by:
        determining a total number of sample attack records with the same attack type corresponding to the sample attack records, and using the total number as a first number;
        determining a number of sample attack records comprising the traversed words in the plurality of sample attack records with the same attack type corresponding to the sample attack records, and using the determined number as a second number; and
        determining importance indexes of the traversed words based on the first number and the second number.

4. The method according to claim 3, further comprising:
for an attack type, taking words in the sample attack records corresponding to the attack type as words for the attack type;
taking an attack type corresponding to an attack keyword with a highest occurrence frequency in the alarm record cluster as a cluster attack type corresponding to the alarm record cluster; and
responding to the alarm query request according to the plurality of alarm record clusters and the cluster attack types corresponding to the plurality of alarm record clusters.

5. The method according to claim 1, further comprising:
acquiring a plurality of sample security records of the service, and determining importance indexes corresponding to a plurality of words in the sample security records on a one-to-one basis;
updating a security word library of the service according to a plurality of words in the sample security records and the importance indexes corresponding to the plurality of words in the sample security records on a one-to-one basis;
after obtaining the plurality of alarm records of the service, the method further comprises:
traversing the plurality of words in the plurality of alarm records, and processing the traversed words:
when the traversed words fail to be matched with words of which the importance indexes satisfy a second index condition in the security word library, retaining the traversed words; and
when the traversed words are successfully matched with the words of which the importance indexes satisfy the second index condition in the security word library, shielding the traversed words.

6. The method according to claim 1, wherein determining the similarity comprises: performing any one of following processes:
performing vector conversion processing on the attack keywords in the plurality of alarm records to obtain representation vectors of the plurality of alarm records, and determining the similarity between the representation vectors respectively corresponding to the different alarm records as the similarity between the different alarm records; and
determining an intersection and a union between the attack keywords corresponding to two alarm records of the plurality of alarm records, and determining a similarity between the two alarm records based on the number of attack keywords in the intersection and the number of attack keywords in the union.

7. The method according to claim 6, wherein performing the vector conversion processing on the attack keywords in the plurality of alarm records comprises:
performing mapping processing on the attack keywords in the plurality of alarm records according to a mapping function to obtain a mapping value corresponding to each of the attack keywords;
performing any one of following processes:
performing numerical value-based ascending sorting processing on a plurality of mapping values, and constructing the representation vectors of the plurality of alarm records by the plurality of mapping values which are consistent with a number set value and sorted top; and
constructing the representation vectors of the plurality of alarm records according to the mapping values corresponding to the minimum numerical value among a plurality of numerical values corresponding to a plurality of mapping functions on a one-to-one basis,
wherein a total number of the plurality of mapping functions is equal to a number threshold.

8. The method according to claim 1, wherein clustering the plurality of alarm records according to the similarity comprises:
traversing the plurality of alarm records, and processing the traversed alarm records by:
determining the numerical maximum similarity between the traversed alarm records and cluster centers of existing alarm record clusters;
when the numerical maximum similarity is greater than or equal to a similarity threshold in the alarm query request, adding the traversed alarm records to the alarm record clusters corresponding to the numerical maximum similarity; and
when the numerical maximum similarity is less than the similarity threshold, creating a new alarm record cluster, and taking the traversed alarm records as a cluster center of the new alarm record cluster.

9. The method according to claim 1, further comprising:
taking the plurality of alarm records successfully matched with query information comprised in the alarm query request as response alarm records; and
presenting father nodes corresponding to the alarm record clusters and child nodes corresponding to the response alarm records in the alarm record clusters, and responding to the alarm query request based on the presented father nodes and child nodes,
wherein the query information comprises at least one of an alarm time range, a threat level, a result of whether response processing has been performed, and a result of whether an alarm is false.

10. The method according to claim 9, wherein presenting the father node comprises:
presenting a father node corresponding to the alarm record cluster and child nodes corresponding to the response alarm records in the alarm record cluster via different presentation parameters,
wherein the presentation parameters comprise at least one of color and size; and
when the father node corresponding to the alarm record cluster and the child nodes corresponding to the response alarm records in the alarm record cluster are presented, the method further comprises:
obtaining the threat levels of the response alarm records corresponding to the child nodes, and presenting the child nodes corresponding to different threat levels through different presentation parameters.

11. The method according to claim 10, wherein presenting the father node comprises:
determining the size of the father node corresponding to the alarm record cluster according to the number of the response alarm records in the alarm record cluster and the size of the child nodes corresponding to the response alarm records,
wherein the sizes of the child nodes corresponding to different response alarm records are the same, and the size of the father node is different from the size of the child nodes;
presenting the father node corresponding to the alarm record cluster according to the size of the father node; and presenting the child nodes corresponding to the response alarm records in the alarm record cluster in the father node according to the size of the child nodes.

12. The method according to claim 11, wherein the presenting the child nodes comprises:
performing any one of the following processing:
presenting a plurality of child nodes subjected to uniform distribution processing in the father node; and
presenting a plurality of child nodes subjected to uniform distribution processing and random offset processing in the father node.

13. The method according to claim 9, further comprising:
performing summary extraction processing on a plurality of response alarm records in the alarm record cluster to obtain summary information about the father node corresponding to the alarm record cluster;
presenting the summary information of a previewed father node in response to a preview operation for any presented father node; and
presenting the response alarm records respectively corresponding to a plurality of child nodes of the selected father node in response to a selection operation for any presented father node.

14. An electronic device, comprising:
a memory, configured to store executable instructions; and
a processor, coupled with the memory and configured, when executing the executable instructions, to perform:
acquiring a plurality of sample attack records of a service, and determining importance indexes corresponding to a plurality of words in the sample attack records on a one-to-one basis, the service being an online service provided by one or more servers to users, the plurality of sample attack records comprising at least source IP addresses and request data of attackers;
updating an attack word library according to the plurality of words in the sample attack records and the importance indexes corresponding to the plurality of words in the sample attack records on a one-to-one basis;
receiving an alarm query request for the service, and acquiring a plurality of alarm records of the service;
performing keyword extraction processing on the plurality of alarm records according to an attack word library of the service to obtain attack keywords, comprising:
screening out multiple words of which the importance indexes satisfy a first index condition in the attack word library; and
processing a plurality of words in the plurality of alarm records by matching each of the plurality of words with the multiple words from the screening, and using words successfully matched as the attack keywords in the plurality of alarm records;
determining a similarity between every two of the plurality of alarm records according to the attack keywords in the plurality of alarm records;
clustering the plurality of alarm records according to the similarity to obtain a plurality of alarm record clusters;
receiving a response processing request for a target alarm record cluster of the plurality of alarm record clusters, the response processing request comprising a blocking or intercepting request; and
responding to the response processing request by performing batch blocking or intercepting processing on source IP addresses in the plurality of alarm records in the target alarm record cluster.

15. The device according to claim 14, wherein the processor is further configured to:
when the importance indexes of words in the attack word library are positively correlated with an actual importance, performing descending sorting processing on the plurality of words in the attack word library based on the importance indexes to obtain a plurality of words sorted top in the attack word library; and
when the importance indexes of the words in the attack word library are negatively correlated with the actual importance, performing ascending sorting processing on the plurality of words in the attack word library based on the importance indexes to obtain a plurality of words sorted top in the attack word library.

16. The device according to claim 14, wherein
each of the sample attack records corresponds to an attack type; and determining the importance indexes corresponding to the plurality of words in the sample attack records on the one-to-one basis comprises:
traversing the plurality of words in the sample attack records, and processing the traversed words by:
determining a total number of sample attack records with the same attack type corresponding to the sample attack records, and using the total number as a first number;
determining a number of sample attack records comprising the traversed words in the plurality of sample attack records with the same attack type corresponding to the sample attack records, and using the determined number as a second number; and
determining importance indexes of the traversed words based on the first number and the second number.

17. A non-transitory computer-readable storage medium, storing executable instructions, wherein when being executed, the executable instructions causes a processor to implement:
acquiring a plurality of sample attack records of a service, and determining importance indexes corresponding to a plurality of words in the sample attack records on a one-to-one basis, the service being an online service provided by one or more servers to users, the plurality of sample attack records comprising at least source IP addresses and request data of attackers;
updating an attack word library according to the plurality of words in the sample attack records and the importance indexes corresponding to the plurality of words in the sample attack records on a one-to-one basis;
receiving an alarm query request for the service, and acquiring a plurality of alarm records of the service;
performing keyword extraction processing on the plurality of alarm records according to an attack word library of the service to obtain attack keywords, comprising:
screening out multiple words of which the importance indexes satisfy a first index condition in the attack word library; and
processing a plurality of words in the plurality of alarm records by matching each of the plurality of words with the multiple words from the screening, and using words successfully matched as the attack keywords in the plurality of alarm records;
determining a similarity between every two of the plurality of alarm records according to the attack keywords in the plurality of alarm records;
clustering the plurality of alarm records according to the similarity to obtain a plurality of alarm record clusters;
receiving a response processing request for a target alarm record cluster of the plurality of alarm record clusters, the response processing request comprising a blocking or intercepting request; and responding to the response processing request by performing batch blocking or intercepting processing on source IP addresses in the plurality of alarm records in the target alarm record cluster.

\* \* \* \* \*